(12) United States Patent
Williams et al.

(10) Patent No.: US 9,795,905 B2
(45) Date of Patent: Oct. 24, 2017

(54) APPARATUS FOR FILTERING AND/OR CONDITIONING AND/OR PURIFYING A FLUID SUCH AS WATER

(71) Applicants: Richard T. Williams, Glenmoore, PA (US); Carl Beiswenger, Pottstown, PA (US)

(72) Inventors: Richard T. Williams, Glenmoore, PA (US); Carl Beiswenger, Pottstown, PA (US)

(73) Assignee: General Ecology, Inc., Exton, PA (US)

( * ) Notice: Subject to any disclaimer, the term of this patent is extended or adjusted under 35 U.S.C. 154(b) by 691 days.

(21) Appl. No.: 14/186,756

(22) Filed: Feb. 21, 2014

(65) Prior Publication Data
US 2014/0166556 A1    Jun. 19, 2014

Related U.S. Application Data

(60) Division of application No. 12/806,233, filed on Aug. 6, 2010, now Pat. No. 8,671,980, which is a
(Continued)

(51) Int. Cl.
*E03B 1/00* (2006.01)
*B01D 35/157* (2006.01)
(Continued)

(52) U.S. Cl.
CPC ....... *B01D 35/1573* (2013.01); *B01D 35/147* (2013.01); *C02F 9/005* (2013.01);
(Continued)

(58) Field of Classification Search
None
See application file for complete search history.

(56) References Cited

U.S. PATENT DOCUMENTS

| 6,193,884 B1 * | 2/2001 | Magnusson | B01D 35/153 |
|---|---|---|---|
| | | | 210/117 |
| 8,671,980 B2 * | 3/2014 | Williams | B01D 35/147 |
| | | | 137/587 |

* cited by examiner

*Primary Examiner* — Richard Gurtowski
(74) *Attorney, Agent, or Firm* — John F. A. Earley, III; Frank J. Bonini, Jr.; Harding, Earley, Follmer & Frailey, P.C.

(57) ABSTRACT

An apparatus for filtering water has an interface and a filtration/purification canister removably mountable thereon. Connecting the canister to the interface automatically opens a check valve in the interface to permit water to flow from the interface into and through the canister, and then back to and through the interface to an outlet port. Disconnecting the canister from the interface automatically closes the check valve, stopping the flow of water. An end cap may be substituted for the canister to permit fluid to flow through the interface when the canister is not mounted on the interface. The outlet port may be directly connected to an appliance that uses water, to eliminate possible contamination that may occur when water is brought indirectly form the outlet port to the appliance instead. A flapper valve is provided in the canister to prevent back flow of fluid from the inlet port of the canister when the canister is not mounted on the interface. The flapper valve also is provided with an actuating means to automatically open the flapper valve when the canister is mounted on the interface, which permits fluid to be drained from the canister when the fluid distribution system is being drained without disconnecting the canister from the interface.

6 Claims, 15 Drawing Sheets

Related U.S. Application Data continuation-in-part of application No. 12/319,219, filed on Jan. 3, 2009, and a continuation-in-part of application No. 12/383,578, filed on Mar. 25, 2009, now Pat. No. 8,877,056.

(51) Int. Cl.
    *B01D 35/147*    (2006.01)
    *C02F 9/00*    (2006.01)
    C02F 1/00    (2006.01)
    C02F 1/44    (2006.01)

(52) U.S. Cl.
    CPC ............ *B01D 2201/302* (2013.01); *B01D 2201/4015* (2013.01); *C02F 1/008* (2013.01); *C02F 1/444* (2013.01); *C02F 2201/001* (2013.01); *C02F 2201/006* (2013.01); *C02F 2301/043* (2013.01); *C02F 2303/04* (2013.01); *Y10T 137/86324* (2015.04); *Y10T 137/87941* (2015.04); *Y10T 137/87949* (2015.04)

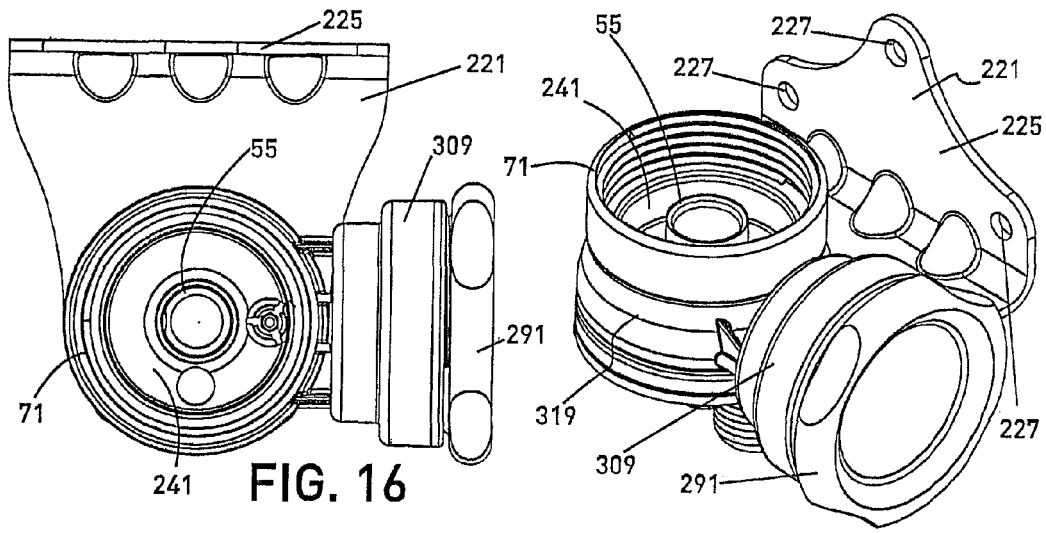
FIG. 16
FIG. 12
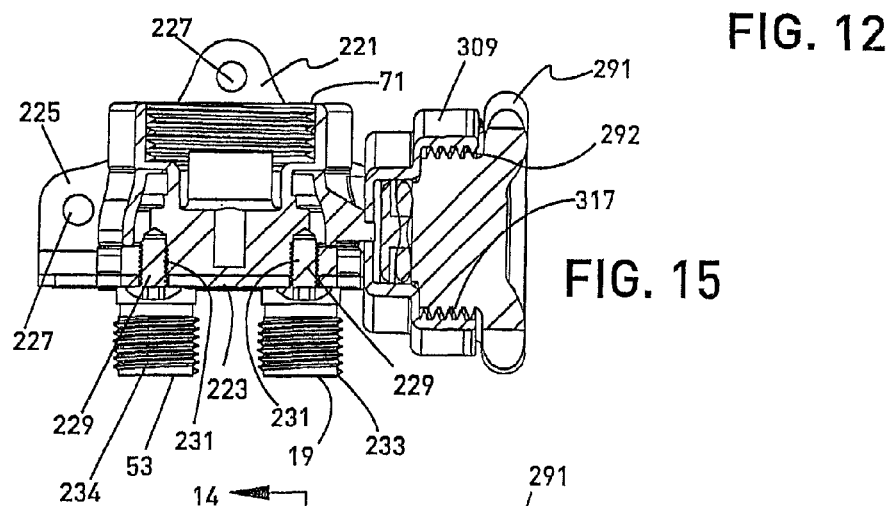
FIG. 15
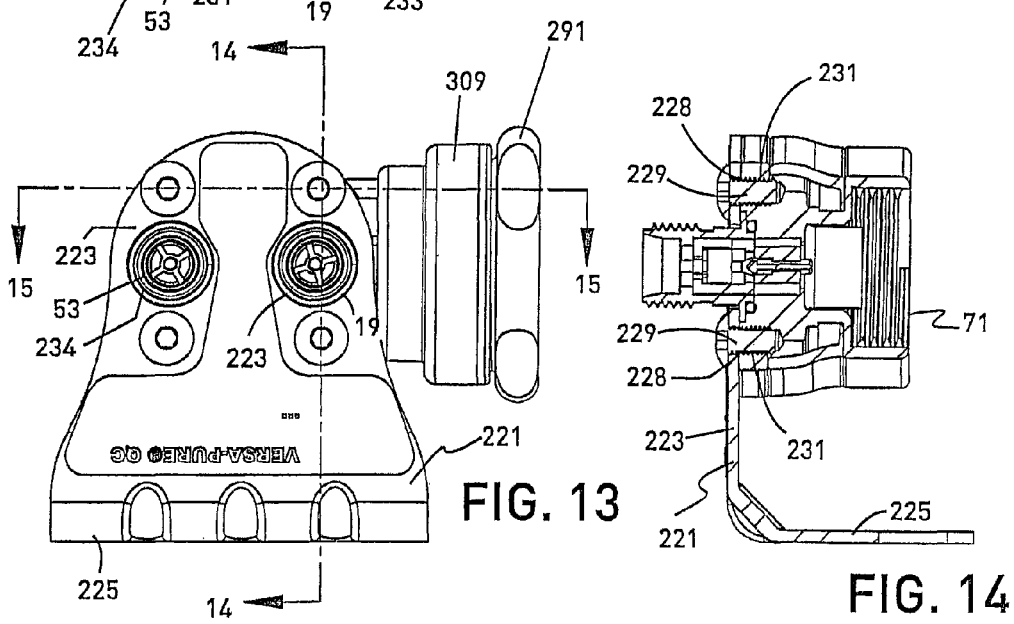
FIG. 13
FIG. 14

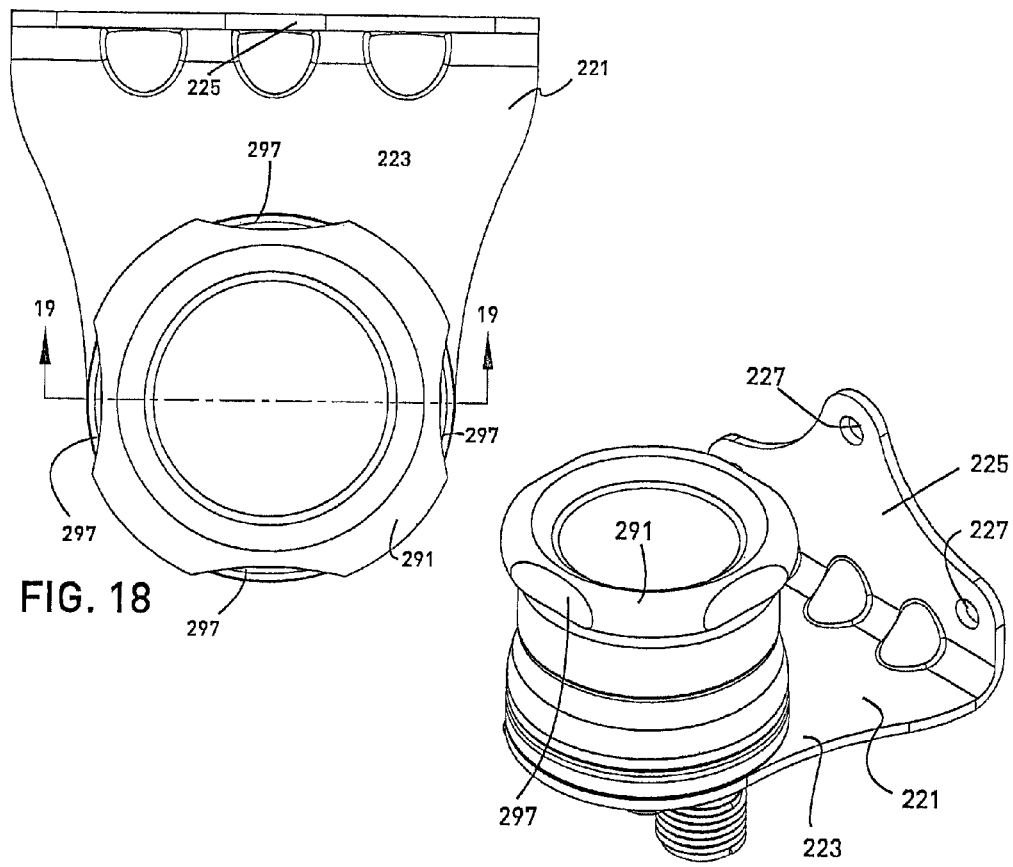
FIG. 18
FIG. 17
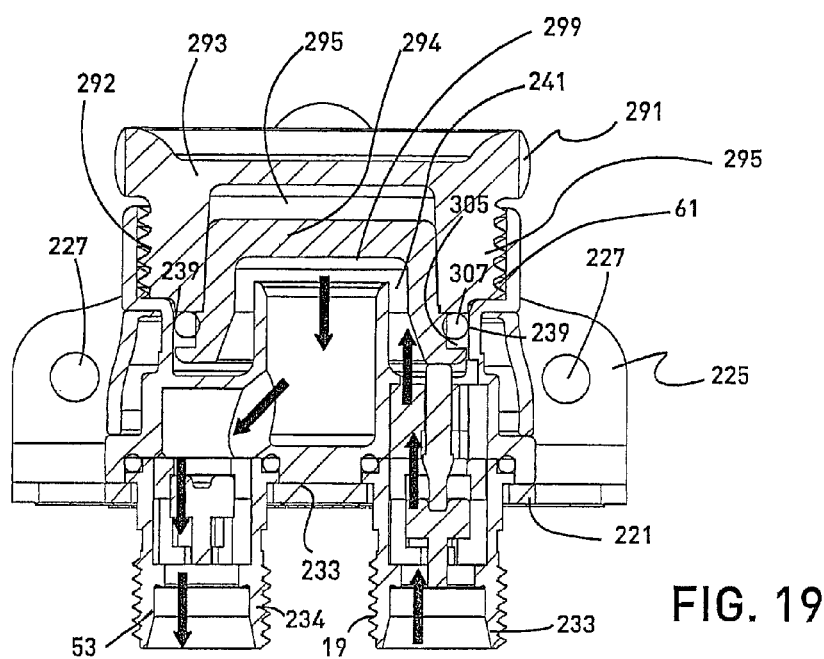
FIG. 19

APPARATUS FOR FILTERING AND/OR CONDITIONING AND/OR PURIFYING A FLUID SUCH AS WATER

CROSS-REFERENCE TO RELATED APPLICATIONS

This application is a divisional application of U.S. patent application Ser. No. 12/806,233 (filed on Aug. 6, 2010), which is incorporated herein by reference and which is a continuation-in-part of our U.S. patent application Ser. No. 12/319,219 (filed on Jan. 3, 2009) and Ser. No. 12/383,578 (filed on Mar. 25, 2009), both of which are incorporated herein by reference.

FIELD OF THE INVENTION

This invention relates to apparatuses for filtering and/or conditioning and/or purifying a fluid such as water, and more particularly concerns such apparatuses that use pressure vessels holding a cartridge, loose media, or the like for filtering and/or conditioning and/or purifying a fluid such as water. This invention also relates to various fluid distribution systems, such as potable water distribution systems for aircraft, for example.

BACKGROUND OF THE INVENTION

Aircraft Potable Water Use—Adequate hydration is particularly important for comfortable air travel, especially aboard modern, very large, long range aircraft capable of flights of 20 or more hours duration. Typically, water is distributed to galleys, lavatories, and drinking water outlets of the aircraft to provide drinking water to passengers, to provide water for food and beverage preparation, and to provide water for personal hygiene (e.g., face and hand rinsing, teeth cleaning, etc.) during flights. Aircraft typically are crowded with thousands of passengers including babies, small children, handicapped people, possibly ill people, and others, from varied backgrounds, passing through a commercial passenger aircraft during a single week. Both passengers and crews contribute to microorganism populations aboard aircraft, and special precautions must be taken to minimize and avoid the possibility of bacteria, viruses, pathogenic cysts, and other microorganisms being transferred among passengers through the water distribution system. Further, water is supplied to aircraft from many locations and varies widely in taste and sanitary quality. In addition to point-of-use effective on-board drinking water microfilters/purifiers, a primary sanitation defense mechanism against bacteria and viruses is to maintain an adequate residual of chlorine, preferably free chlorine, within the water storage and distribution systems. Further, effective on-board point-of-use drinking water microfilters/purifiers reliably remove parasitic cysts (leading causes of water borne disease worldwide) such as Giradia and Crypto which are not controlled by chlorination.

Aircraft Water Distribution and Management—Typically, a water distribution system on aircraft comprises a water storage tank supplying a centralized distribution line with various branches or legs extending from the central distribution line to locations throughout the aircraft. For example, water is distributed via the water distribution system to galleys, lavatories, and other locations as needed for food and beverage preparation, and for personal hygiene during flights. Galleys include many "service points" such as coffee makers, water boilers, and drinking water outlets. Similarly, lavatories often include drinking water outlets and may be used for face and hand rinsing, cleaning teeth and short term personal medication. There are many possible opportunities for aircraft drinking water systems/supplies to become contaminated with microorganisms even if hygienically safe when loaded aboard an aircraft.

Typically, water filter/purifier units, each comprising a housing pressure vessel and a filtration/purification cartridge, are installed in or near galleys and lavatories as part of the aircraft water distribution system to improve water quality for consumption and for food and beverage preparation. Purifiers (water filter/purifiers having a purification element) must be independently certified to meet the EPA Guide Standard Protocol for Microbiological Purifiers relative to bacteria, viruses and cysts. Structured Matrix™ purifiers, sold by General Ecology, Inc., also provide excellent filtration. Filters, such as General Ecology, Inc.'s Structured Matrix™ microfilters or simple, fine, or coarse carbon and/or sediment systems, may be sophisticated, but such filters cannot legally be referred to as microbiological purifiers before being verified that they meet the EPA Guide Standard Protocol for Microbiological Purifiers. Space in galley and lavatory compartments is expensive and severely limited. Accordingly, water filter/purifier units usually are installed in "out of the way", often difficult to access locations often behind other more readily accessible equipment and bulkheads.

Sanitation Practices—Possible microorganisms of concern are pathogenic bacteria, cysts and viruses. Chlorine resistant pathogenic cysts such as Crypto require special consideration and protective measures, such as providing point-of-use water filter/purifier units (e.g., water purifiers along the aircraft water distribution system to remove pathogenic cysts from the water moving through them). Such water filter/purifier units also remove bacteria, viruses, and other microorganisms from the water moving through them. Further, to overcome the challenges of virus and bacteria transmission via water systems and colonization within the aircraft potable water distribution systems, airlines often try to assure an adequate chlorine residual within the aircraft water supply. Even so, it is necessary to periodically "sanitize" the aircraft water distribution system, typically with a 2+ hours soak of high concentration (100 ppm) chlorine solutions. The sanitation process requires time and labor intensive removal of filtration/purification cartridges from the water filter/purifier units installed in galleys, fountains, and lavatories throughout the aircraft prior to the sanitation process. After removal of cartridges, pressure vessels must be reassembled to allow complete distribution of the sanitizing solution through the water distribution system and to prevent leakage of this highly corrosive and oxidizing sanitizing solution during the two hours sanitization soak.

Cartridge removal is required for at least two reasons: 1) because a high concentration of chlorine is detrimental to most filtration/purification cartridges, and 2) more importantly, because microorganisms might be sheltered in crevices and imperfections at sealing surface interfaces (ideal locations for biofilm formation) of the water filter/purifier units compromising effectiveness of the sanitizing process, thereby allowing recolonization of the distribution system. Even though sanitization is recognized as effective, typically because of the relatively high cost of the sanitizing process and the revenue lost due to the downtime of the aircraft during the sanitizing process, sanitization is performed infrequently—possibly every six months or at a convenient "A Check" or more extensive maintenance intervals when other maintenance is carried out.

After chlorine flushing and soaking for two hours, following current practices, the pressure vessels once again are opened and the same cartridges (or new replacement cartridges) are installed. Potable water is flushed throughout the aircraft water distribution system to thoroughly remove the extremely high concentration sanitizing solutions. Several hours may be required to sanitize an aircraft resulting in costs averaging upwards to hundreds of dollars per unit. More efficient, lower cost sanitization would allow more frequent sanitization and provide possibly higher quality potable water with better economy.

System Draining and Refilling—Water must be drained from aircraft during periods of non-use (such as overnight) in cold climates. Proposed EPA regulations require much more frequent draining and filling of water storage tanks in an effort to improve aircraft drinking water quality and safety. Draining and filling water systems requires "vacuum breaks" at equipment locations to allow water to be properly released and "vents" to allow air to escape in order to assure proper functioning of filters, purifiers, and other equipment. Although the very latest filter/purifier units include automatic vacuum breaks and venting, most aircraft units require manual actuation often resulting in inadequate water draining and filling Also, under the proposed EPA regulations, it is likely that accessing and actuating manual vents and vacuum breaks, sometimes previously ignored, may become a significantly higher maintenance cost item due to difficult access to the water filter/purifier units and aircraft "out of service" revenue costs.

Microorganism Growth—Even with periodic sanitization, bacteria may colonize various branches (legs) of water distribution systems. Bacteria multiply rapidly, sometimes doubling in number in approximately 16 minutes. Therefore, a small number of bacteria may quickly reach infectious concentrations in water intended to be consumed, especially downstream of improperly installed/serviced filters/purifiers employed to remove chlorine, foul tastes, and odors. Further, water filter/purifier units installed in semi-remote locations along the water distribution system often require longer than desired distribution lines to specific service points (e.g., locations where the water is discharged from the water distribution system). These distribution lines provide unnecessary opportunities for previously purified water to be recontaminated from inadvertent inoculation, short term bacteria multiplication or biofilm formation/shedding that may have taken place in such distribution lines downstream of the water filter/purifier units.

SUMMARY OF THE INVENTION

It is an object of the invention to provide an apparatus for filtering and/or conditioning and/or purifying a fluid such as water.

It is another object of the invention to enable and introduce a new concept to provide more efficient, more cost effective, improved water quality management aboard passenger aircraft, and for other applications. For example, and more specifically with respect to passenger aircraft applications, the concept is to provide water filter and water purifier systems installed at various aircraft cabin crew readily accessible service locations (service points) within galleys and lavatories of the aircraft, preferably at or near where the water that is filtered and/or conditioned and/or purified for immediate use. This invention provides for various types of filtering and purifying processes being available in interchangeable self-contained canisters (e.g., pressure vessels 15, each containing filtration and/or purification media 16) attached to interfaces integrated into the water distribution system at appropriate cabin crew readily accessible locations. Stored water can then be filtered and/or purified immediately at the time and place of use as it is discharged from the potable water distribution system.

Another object of the invention is to provide an aircraft potable water distribution system having interfaces installed locally at various cabin crew readily accessible service locations or service points within galleys and lavatories of the aircraft, to connect an outlet port of at least one of the interfaces directly to an appliance such as a coffee maker or other water-using equipment located in the galley of the aircraft to reduce possible exposure of the water that has been filtered and/or conditioned and/or purified to contaminants that may be encountered if water were to be indirectly brought from the outlet port of the interface to the appliance instead.

Still another object of the invention is to provide an apparatus and aircraft potable water distribution system that allows non-technical flight attendants servicing, that is, removal of filtration/purification cartridges, and replacement thereof, on a frequent basis as an extension of normal routines, without requiring professional maintenance crew attendance and support.

These and other objects are provided by our invention, a description of which is set out below.

BRIEF DESCRIPTION OF THE DRAWINGS

FIG. 12 is a view in perspective showing the interface 13 of the invention with the mounting bracket 221 and the end cap holder 309 (with the end cap 291 stored therein) mounted to the interface 13.

FIG. 13 is a bottom plan view of the interface 13, the mounting bracket 221, the end cap holder 309, and the end cap 291 shown in FIG. 12.

FIG. 14 is a view in cross-section taken along the lines and arrows 14-14 shown in FIG. 13.

FIG. 15 is a view in cross-section taken along the lines and arrows 15-15 shown in FIG. 13.

FIG. 16 is a top plan view of the interface 13, the mounting bracket 221, the end cap holder 309, and the end cap 291 shown in FIG. 12.

FIG. 17 is a view in perspective of the interface 13 showing the mounting bracket 221 mounted on the interface 13 and the end cap 291 screwed into the recess 241 in the interface 13. In this figure, the end cap holder 309 has not been secured to the interface 13.

FIG. 18 is a top plan view of the interface 13, the mounting bracket 221, and the end cap 291 shown in FIG. 17.

FIG. 19 is a view in cross-section taken along the lines and arrows 19-19 shown in FIG. 18

DETAILED DESCRIPTION

Turning now to the drawings, there is shown the inventive apparatus 11 for filtering and/or conditioning and/or purifying a fluid, such as water. (Purification, per EPA regulations, requires performance meeting the EPA Guide Standard Protocol for Microbiological Purifiers; filtration and conditioning may be almost anything else that is useful, such as taste and odor removal, scale control, etc.)

Figure 1:
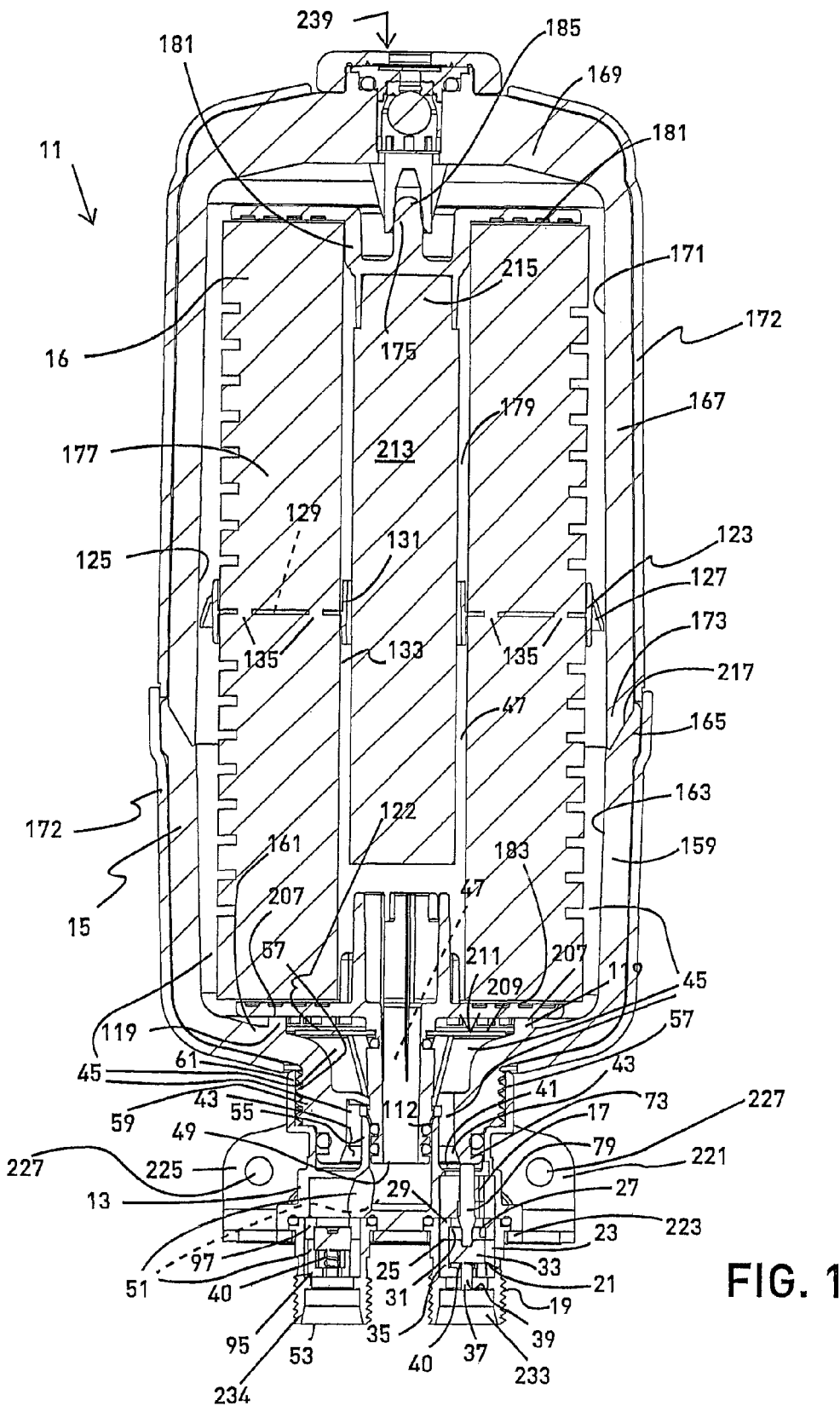
FIG. 1 is a view in cross-section of an apparatus 11 for filtering and/or conditioning and/or purifying a fluid such as water, constructed in accordance with the invention. In this figure, the end cap holder 309 has not been secured to the interface 13.
Figure 2:
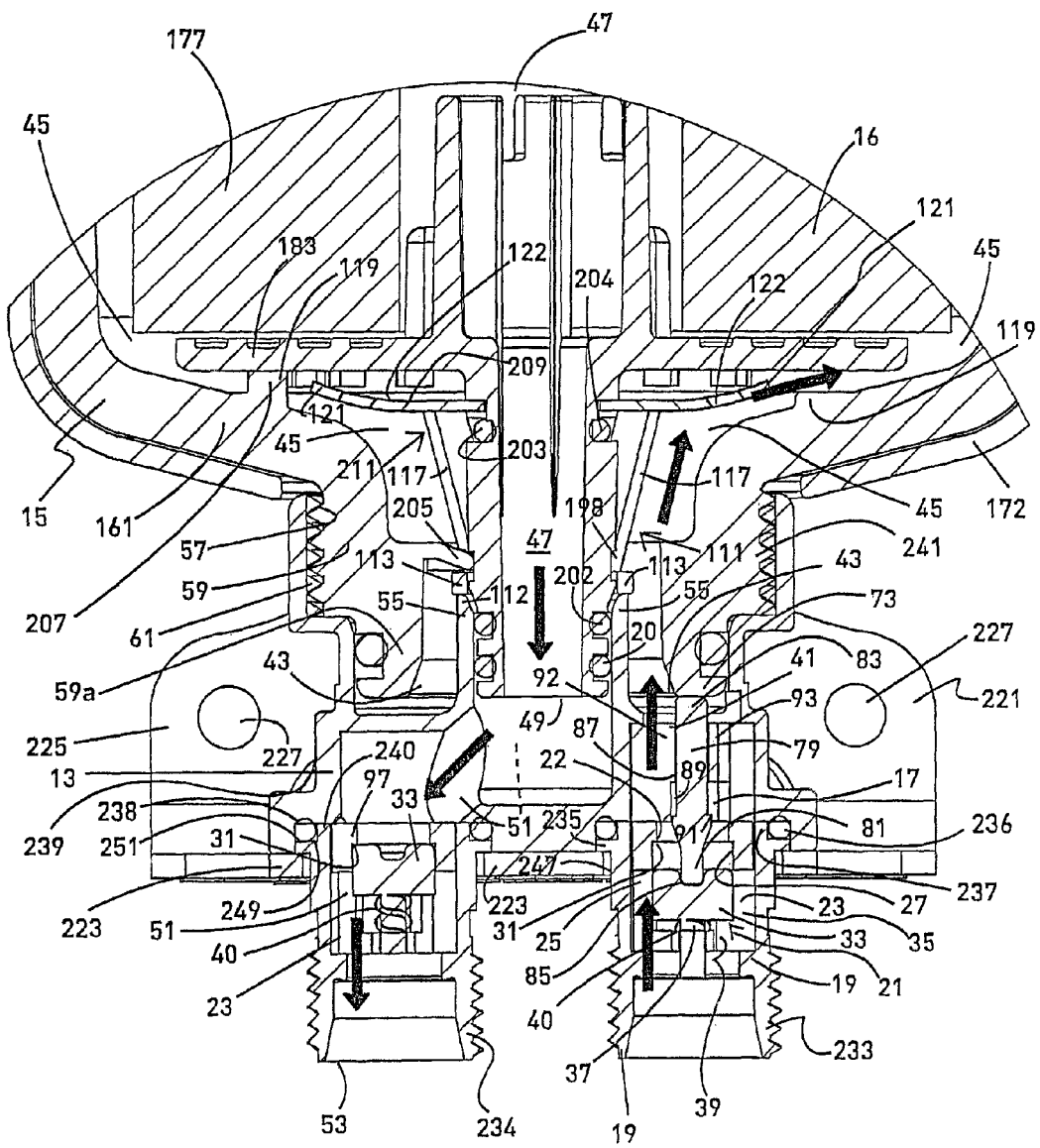
FIG. 2 is an enlarged view of a portion of FIG. 1, except the lug 207 on the right side of FIG. 1 has been omitted from FIG. 2 to show more clearly the ridge or ramp 119 on which the lugs 207 are formed and some additional portions are shown in cross-section.
Figure 3:
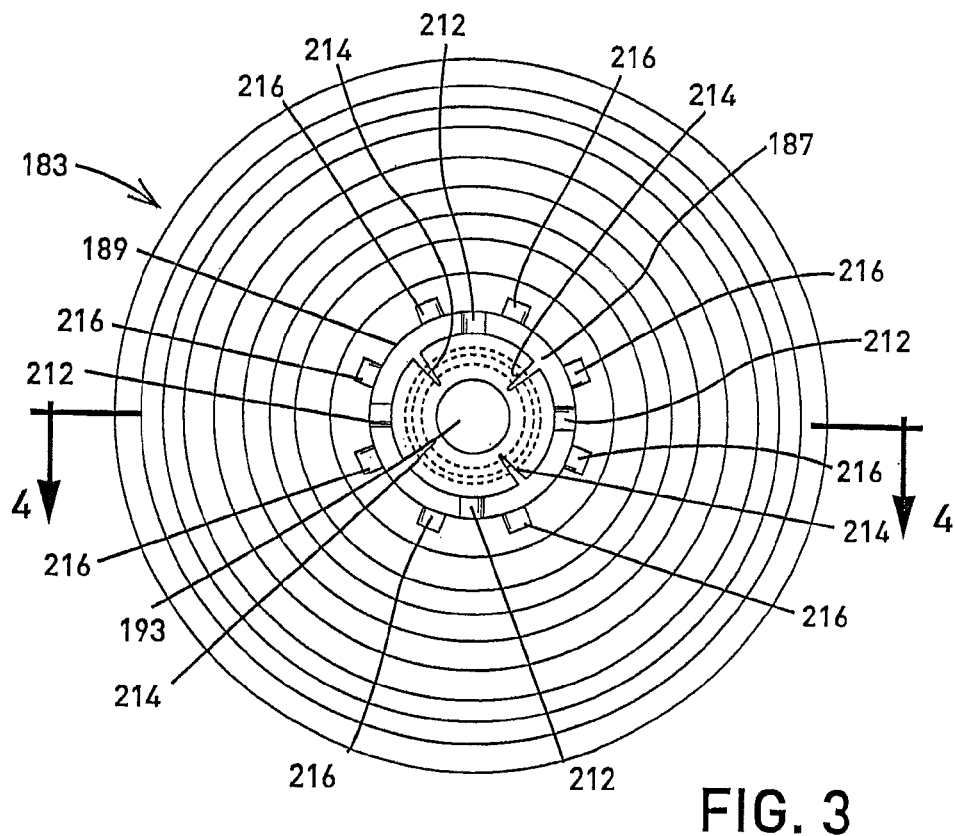
FIG. 3 is a view in bottom plan of the end cap 183 which has a hollow tube 187 that functions as the outlet port from the canister (the pressure vessel 15 having the cartridge 16 mounted therein).
Figure 4:
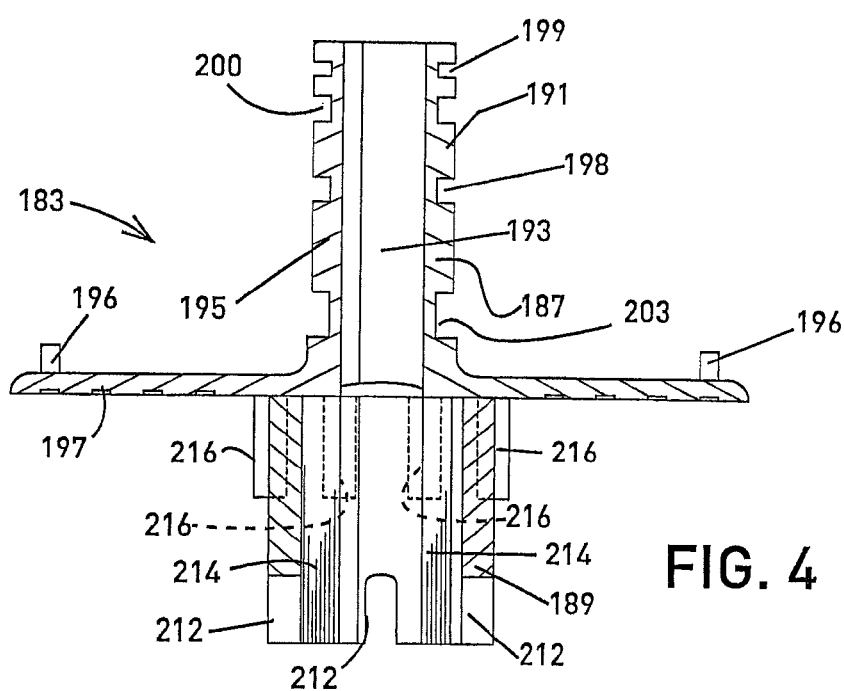
FIG. 4 is a view in cross-section taken along the lines and arrows 4-4 shown in FIG. 3.
Figure 23:
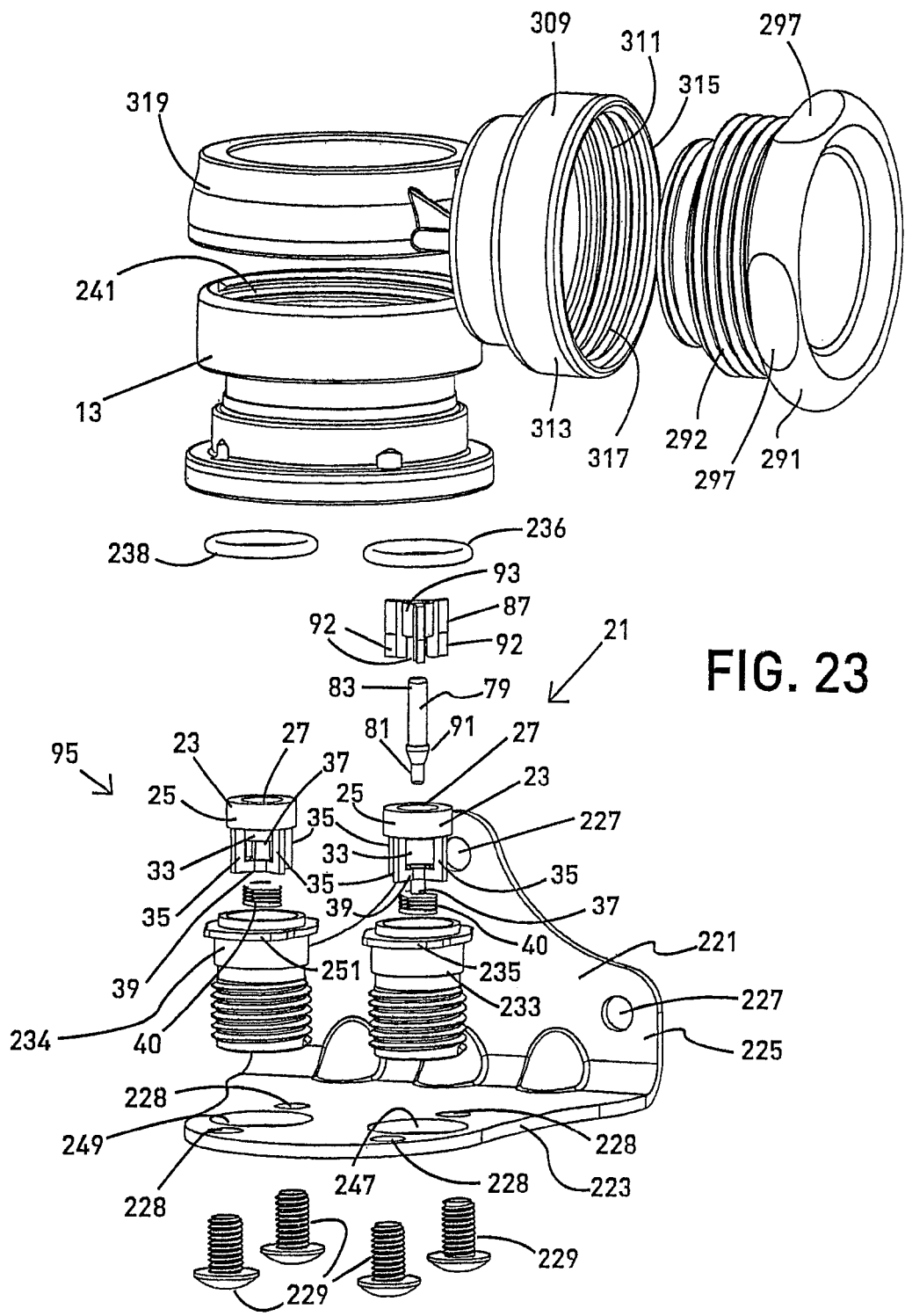
FIG. 23 is an exploded view of the apparatus 11 without the pressure vessel 15 but with the end cap 291 and the end cap holder 309. When the valve 21 and the valve 95 are assembled, springs 40 are located within the valve housing 23 of each valve.

Referring particularly to FIGS. 1, 2, and 23, apparatus 11 includes an interface 13 (also known as an automatic valving unit or a valve head or manifold) for a pressure vessel 15 that holds a cartridge 16, or loose media, or the like for filtering and/or conditioning and/or purifying a fluid, such as water. The interface 13 automatically provides for fluid flow into the pressure vessel 15 when the pressure vessel 15 is connected to the interface 13, and automatically discontinues fluid flow from the interface 13 when the pressure vessel 15 is disconnected from the interface 13.

The interface 13 preferably is machined from a metal such as stainless steel or aluminum preferably coated and sealed with a hard aluminum oxide coating for scratch resistance and long life.

As shown in FIGS. 1 and 2, the interface 13 has a first passageway 17 extending through it and adapted to be connected to a fluid transmission line, such as a water supply line of an aircraft potable water distribution system. Preferably, the interface 13 has a threaded inlet port 19 at the entrance of the first passageway 17 that receives a threaded female fitting of the fluid transmission line.

Referring particularly to FIG. 2, a first valve 21 is positioned on an annular ledge 22 formed in the first passageway 17 of the interface 13 for blocking flow of fluid through the first passageway 17 when the valve 21 is closed. Preferably, the first valve 21 is a check valve (hereinafter referenced to as "first check valve 21" or "valve 21"), and preferably first check valve 21 includes a valve housing 23 (preferably made of a suitable polymeric material) having an annular ring-shaped base portion 25 that has an annular inner wall surface 27. An annular ledge 29 is formed on the inner wall surface 27 creating a valve seat 31.

Preferably, the first check valve 21 also includes a movable valve disk 33 (preferably made of a suitable polymeric material) that is contained within the valve housing 23 and closes the first check valve 21 when the valve disk 33 rests against the valve seat 31 and that permits flow of fluid through the first check valve 21 when the valve disk 33 is not resting against the valve seat 31. The valve housing 23 preferably also includes a plurality of arms 35 that extend away from the base portion 25 of the valve housing 23 and over the opening in the valve housing 23 formed by the annular ring-shaped base portion 25 to form a cage-like structure that contains the valve disk 33 in the valve housing 23. As shown in FIGS. 2 and 23, preferably the valve disk 33 has a guide pin 37 formed on and extending upstream from its upstream face that is engaged by and slides in a guide pin holder 39 (a small hollow cylinder) formed on the ends of the arms 35 where the arms 35 meet over the opening in the annular ring-shaped base portion 25 to keep motion of the valve disk 33 on a line that permits proper seating of the valve disk 33 on the valve seat 31. A spring 40 is provided in valve 21 to bias the valve 21 in a closed position. That is, the spring 40 is provided in valve 21 to bias the valve disk 33 against the valve seat 31.

An outlet port 41 is formed at the outlet end portion of the first passageway 17 of the interface 13.

Referring to FIGS. 1 and 2, the pressure vessel 15 has an inlet port 43 that is in fluid communication with the outlet port 41 formed at the outlet end portion of the first passageway 17 in the interface 13 when the pressure vessel 15 is connected to the interface 13. The pressure vessel 15 has a first passageway 45 extending from the inlet port 43 of the pressure vessel 15 to the cartridge 16, or loose media, or the like, through which the fluid passes to filter and/or condition and/or purify the fluid, and a second passageway 47 extending from the cartridge 16, or loose media, or the like to an outlet port 49 of the pressure vessel 15.

The interface 13 also is provided with a second passageway 51 extending through it and adapted to be connected to a fluid receiving line (such as a water faucet of an aircraft potable water distribution system or an apparatus such as a coffee maker used on an airplane) at an outlet port 53 of the second passageway 51. Preferably, the outlet port 53 has a threaded fitting that is received in a threaded female fitting of the fluid receiving line.

The interface 13 has an inlet port 55 formed at an inlet portion of the second passageway 51 in the interface 13 that is in fluid communication with the outlet port 49 of the pressure vessel 15 when the pressure vessel 15 is connected to the interface 13.

Referring to FIGS. 1 and 2, connecting/disconnecting means is provided for connecting the pressure vessel 15 to the interface 13, when desired, to permit flow of fluid from the first passageway 17 in the interface 13 to the inlet port 43 of the pressure vessel 15, and for disconnecting the pressure vessel 15 from the interface 13, when desired, to stop flow of fluid from the first passageway 17 in the interface 13. Preferably, the connecting/disconnecting means comprises threads 57 formed on the outer surface of the neck 59 of the pressure vessel 15 and matching threads 61 formed on the interface 13, such as that disclosed in Williams U.S. Pat. No. 5,695,168, which is incorporated herein in its entirety by reference.

Alternatively, the connecting/disconnecting means may comprise a bayonet-style mount, including a plurality of grooves formed on the neck 59 of the pressure vessel 15, and a corresponding number of pins mounted on the interface 13, such as that shown in our U.S. patent application Ser. No. 12/319,219. Each groove has a first end portion where a corresponding pin may be inserted and moved along the groove by turning the pressure vessel 15 around its central axis until the pin reaches a second end portion of the groove, thereby securing the pressure vessel 15 to the interface 13.

Referring again to FIGS. 1, 2, and 23, actuating means is provided for automatically opening the valve 21 when the pressure vessel 15 is connected to the interface 13. Preferably, the actuating means includes a pin 79 that is positioned in the first passageway 17 of the interface 13 between the valve disk 33 and the outlet port 41 at the outlet end portion of the first passageway 17 of the interface 13. The pin 79 has a first end portion 81 and a second end portion 83, the first end portion 81 engaging the valve disk 33 by being received in a bore 85 formed in the downstream face of the valve disk 33, and the second end portion 83 being held by a pin holder 87 (positioned between valve 21 and an annular ledge 89 in the first passageway 17) in which the pin 79 is free to slide back and forth along the center axis of the pin 79. A radially extending ridge 91 is provided on the pin 79 to abut against a portion of the pin holder 87 to prevent the pin 79 from falling completely out of the first passageway 17 through the outlet port 41. The cross-section of the pin 79, even at the ridge 91, is smaller than the cross-section of the first passageway 17 so that fluid may flow through the first passageway 17 where the pin 79 is positioned when the valve 21 is open. Also, when the valve 21 is open, fluid may pass through the first passageway 17 where the pin holder 87 is located by passing between the spacing flanges 92 (three such spacing flanges 92 being used in the embodiments of the invention shown in the drawings), which surround and position a tubular section 93 (which holds the second end portion of the pin 79 in a sliding relationship) in the first passageway 17 in alignment with the valve disk 33.

The length of the pin 79 is such that when the pressure vessel 15 is connected to the interface 13, the first end portion 73 of the neck 59 of the pressure vessel 15 pushes against the pin 79 causing the first end portion 81 of the pin 79 to push the valve disk 33 off and sufficiently away from the valve seat 31 to open the valve 21 to permit flow of fluid through the valve 21 and passageway 17.

Referring to FIGS. 2 and 23 in particular, preferably, the interface 13 also is provided with a second valve 95 that is positioned on an annular ledge 97 formed in the second passageway 51 of the interface 13 for blocking backflow of fluid from the second passageway 51 of the interface 13, especially when the pressure vessel 15 is not connected to the interface 13. Preferably, the second valve 95 is a check valve 95 (hereinafter referred to as "second check valve 95" or "valve 95"), and preferably second check valve 95 includes a valve housing 23 which contains a movable valve disk 33, as described above for the first check valve 21. Like first valve 21, a spring 40 is provided in second valve 95 to bias the valve 95 in a closed position. That is, the spring 40 of valve 95 is provided to bias the valve disk 33 of valve 95 against the valve seat 31 of valve 95. The flow of fluid from the pressure vessel 15 pushes the movable disk 33 of the second check valve 95 off the valve seat 31 of the second check valve 95 and moves it in the downstream direction away from the valve seat 31 of the second valve 95 to permit fluid flowing from the pressure vessel 15 to flow through the second valve 95 and through the second passageway 51 of the interface 13 to the fluid receiving line connected to the outlet port 53 of the second passageway 51 of the interface 13. However, backflow of fluid through the second passageway 51 of the interface 13 is blocked by the second check valve 95 due to the spring 40 of the valve 95 pushing the valve 95 into a closed position if flow of fluid through the second valve 95 from upstream of the valve 95 to downstream of the valve 95 ceases and due to any backflow of fluid pushing the moveable disk 33 of the second check valve 95 onto the valve seat 31 of the second check valve 95, thereby causing the second check valve 95 to close.

Referring to FIG. 1, the pressure vessel 15 includes a cover 159 having a top wall 161 and a side wall 163, which has a lower end portion on which a cover rim 165 is formed. The pressure vessel 15 also includes a bowl 167 having a bottom wall 169 and a side wall 171, which has an upper end portion on which a bowl rim 173 is Ruined. Preferably, the pressure vessel 15 is provided with a protective shell 172, and preferably the protected shell 172 is fire resistant.

In the embodiment of the invention illustrated in the drawings, the means for filtering and/or conditioning and/or purifying a fluid comprises a cartridge 16. As shown in FIG. 1, preferably, the cartridge 16 comprises a cylindrical microfiltration matrix 177 for filtering and/or conditioning and/or purifying a fluid passing through it. The matrix 177 has a cylindrical channel 179 along its center axis that receives the fluid after it has passed through the matrix 177, the channel 179 comprising part of the second passageway 47 of the pressure vessel 15. An end cap 181 is secured to the bottom end of the matrix 177, and an end cap 183 is secured to the top end of the matrix 177. To secure the cartridge 16 inside the pressure vessel 15, the bowl 167 is provided with a recess 185 formed in the bottom wall 169 of the bowl 167 that receives a stabilizing stub 175 formed in the end cap 181 to prevent the cartridge 16 from swaying back and forth inside the pressure vessel 15 during use.

Referring to FIGS. 1 to 4, the end cap 183 comprises a hollow tube 187 having a first end portion 189, a second end portion 191, and a passageway 193 extending through the tube 187 from the first end portion 189 (where it receives fluid from the channel 179) to the second end portion 191, the passageway 193 also comprising part of the second passageway 47 of the pressure vessel 15. The tube 187 has an exterior surface portion 195 onto which is integrally formed therewith a flange portion 197 that engages the top end of the matrix 177. Preferably, the tube 187 has two annular grooves 199 and 200 formed at its second end portion 191 that receive o-rings 201 and 202 for sealing between the tube 187 and the hollow cylindrical inlet port 55 to the second passageway 51 in the interface 13 (thereby establishing a sealed connection between the outlet port 49 of the pressure vessel 15 and the inlet port 55 to the second passageway 51 in the interface 13) when the pressure vessel 15 is connected to the interface 13. Preferably, the second end portion 191 of the tube 187 is provided with an antimicrobial surface, such as by impregnating the second end portion 191 with antimicrobial materials such as those sold by AgION Technologies, Inc., of Wakefield, Mass.

Figure 5:
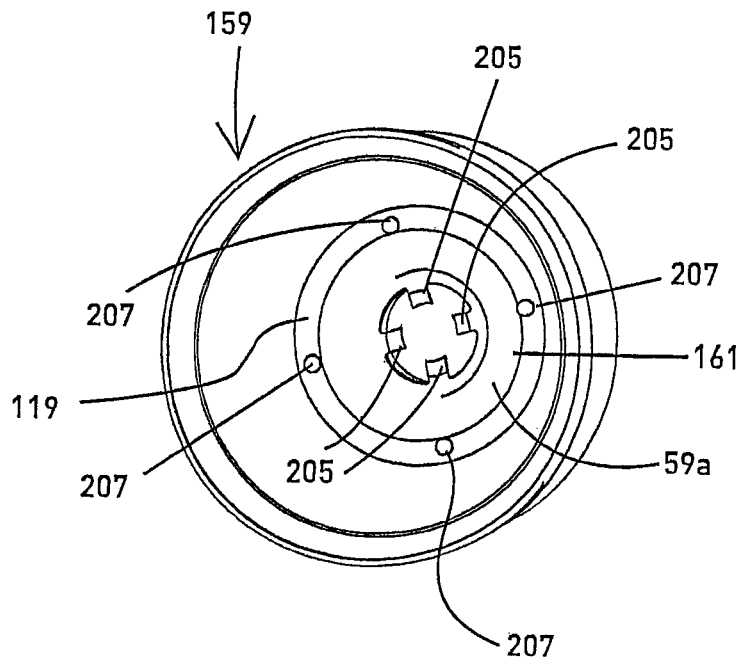
FIG. 5 is a view in perspective of the cover 159 of the pressure vessel 15, showing the inside of the cover 159.
Figure 6:
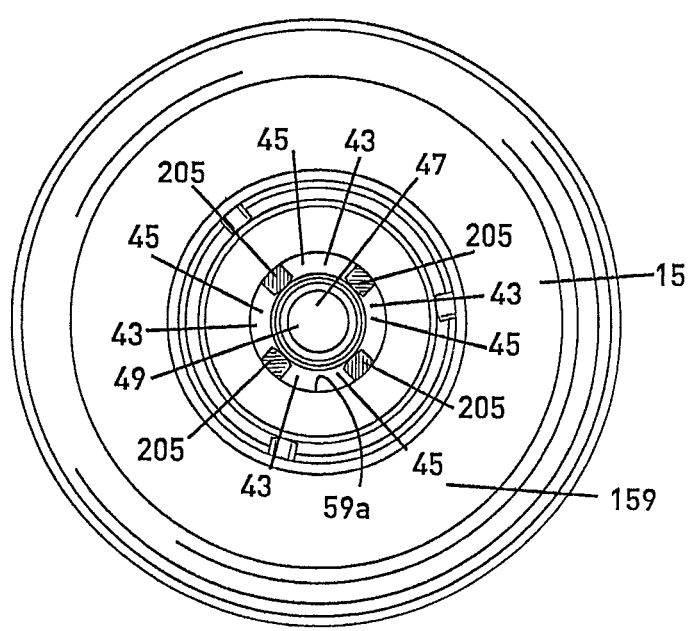
FIG. 6 is a top plan view of a canister (the pressure vessel 15 containing a cartridge 16) of the invention.

Referring to FIGS. 1 to 4, the tube 187 also has another annular groove 198 formed in the second end portion 191 that receives a plurality of fingers or projections 205 (four fingers 205 being used in the embodiment of the invention shown in the drawings) (see FIGS. 5 and 6) integrally formed with the neck 59 and extending inwardly from the wall 59a of the neck 59 for positioning the tube 187 so that it extends along the central axis of the neck 59 and secures the cartridge 16 against both horizontal and vertical movement in the pressure vessel 15. Also, a plurality of projections or lugs 207 (there being four lugs 207 used in the embodiment of the invention shown in the drawings) preferably is provided on an annular ridge or ramp 119 that preferably is formed in the top wall 161 of the cover 159. The lugs 207 abut against the flange portion 197 of the end cap 183 to secure the cartridge 16 against vertical movement in the pressure vessel 15. A plurality of evenly spaced apart lugs 196 is formed on the flange 197 of the end cap 183 around its peripheral portion, and the lugs 207 also abut against the flange 197 between a pair of the lugs 196 to secure the cartridge 16 against rotational movement in the pressure vessel 15. If the ridge or ramp 119 is not provided, the lugs 207 preferably are still provided by forming them in the top wall 161 of the cover 159.

Referring to FIGS. 1 and 2, preferably, the pressure vessel 15 is provided with a flapper valve 211, which includes a flexible disk 209. A groove 203 receives the center portion of a flexible disk 209, that extends outwardly from the tube 187 and, when the flapper valve 211 is in a first or "closed" position, engages a portion of the neck 59 formed in the cover 159 to close the flapper valve 211 to reduce/prevent fluid from back flowing from the inlet port 43 of the pressure vessel 15. When the pressure vessel 15 is not connected to the interface 13, any backflow of fluid in the first passageway 45 of the pressure vessel 15 pushes against the side 122 of the disk 209 facing away from the inlet port 43 of the pressure vessel 15 to push the disk 209 into contact with the interior neck wall 59a of the pressure vessel 15 to close the flapper valve 211 and the first passageway 45 of the pressure vessel 15 at the flapper valve 211 to reduce/prevent backflowing of fluid from the inlet port 43 of the pressure vessel 15. The flapper valve 211 prevents backflow of fluid from the first passageway 45 of the pressure vessel 15, because any flow of fluid back flowing from downstream to upstream in the first passageway 45 of the pressure vessel 15 when the disk 209 of the flapper valve 211 is not being prevented from moving into contact with the neck wall 59a pushes against the flexible disk 209 causing it to flex into engagement with the neck wall 59a formed in the cover 159 to close the flapper valve 211, thereby blocking backflow of fluid from the first passageway 45 of the pressure vessel 15.

Preferably, the width of the groove 203 (that is, the distance across the groove 203) is such that the disk 209 is movable axially along the tube 187 in the annular groove 203 formed on the tube 187 between a closed position for the flapper valve 211, in which the disk 209 closes the first passageway 45 of the pressure vessel 15 by extending across the first passageway 45 of the pressure vessel 15 and into contact against a portion of the neck wall 59a of the pressure vessel 15 along the first passageway 45 of the pressure vessel 15 and thereby reduce/prevent fluid from back flowing from the inlet port 43 of the pressure vessel 15, and an open position for the flapper valve 211, in which the disk 209 is positioned out of contact with the neck wall 59a of the pressure vessel 15 along the first passageway 45 of the pressure vessel 15 to open the first passageway 45 of the pressure vessel 15 to fluid flow through the first passageway 45 of the pressure vessel 15.

Figure 7:
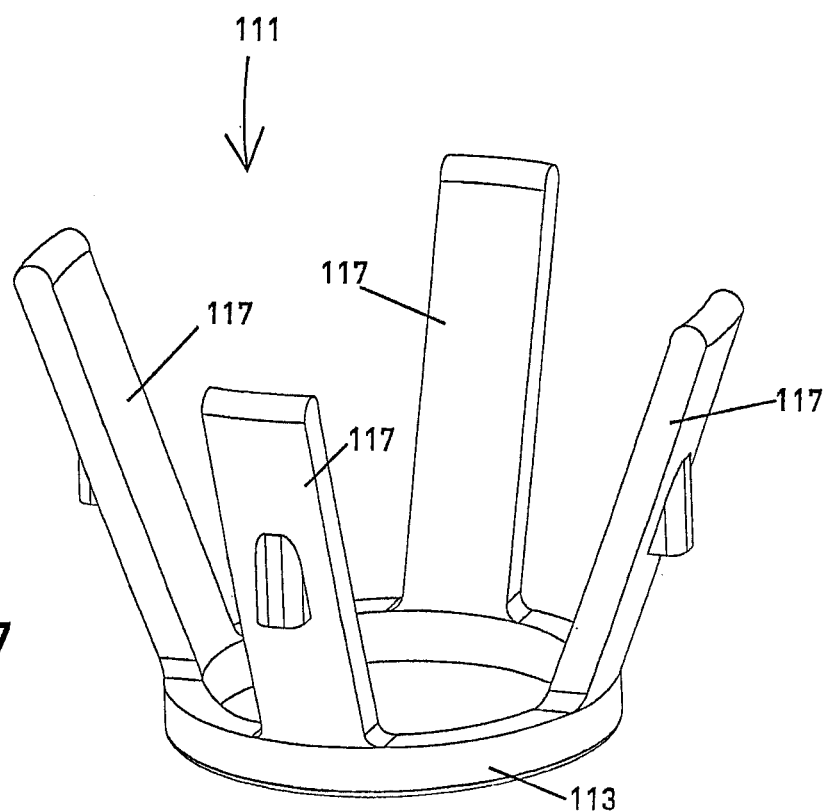
FIG. 7 is a view in perspective of the actuating means 111 for automatically opening the flapper valve 211 when the pressure vessel 15 is connected to the interface 13.

Preferably, the flapper valve 211 also includes an actuating means 111 (see FIGS. 1, 2, and 7) for automatically opening the flapper valve 211 when the pressure vessel 15 is connected to the interface 13. In the embodiment of the invention shown in the drawings, the actuating means 111 includes a ring 113 positioned around the exterior surface portion 195 of the tube 187. The ring 113 is movable axially along the tube 187. The ring 113 has at least one projection or leg 117 (there being four legs 117 in the embodiment of the invention shown in the drawings) extending from it towards the disk 209, and the at least one projection or leg 117 moves towards and into contact with the disk 209 when the ring 113 is moved towards the disk 209 to push the disk 209 out of contact with the neck wall 59a of the pressure vessel 15 along the first passageway 45 of the pressure vessel 15 to open the first passageway 45 of the pressure vessel 15.

The actuating means 111 further includes an end portion 112 of the inlet port 55 of the interface 13 that engages and pushes the ring 113 towards the disk 209 such that the at least one projection or leg 117 extending from the ring 113 towards the disk 209 moves into contact with the disk 209 and raises the disk 209 out of contact with the neck wall 59a of the pressure vessel 15 along the first passageway 45 of the pressure vessel 15 when the pressure vessel 15 is connected to the interface 13 to place and maintain the flapper valve 211 in the open position while the pressure vessel 15 is connected to the interface 13.

Preferably, the at least one projection or leg 117 extends from the ring 113 such that the at least one projection or leg 117 is angled away from the tube 187. The ring 113 is positioned on the tube 187 around the second end portion 191 of the tube 187 such that the at least one projection or leg 117 extends inwardly into the pressure vessel 15 past the fingers or projections 205. Accordingly, when the pressure vessel 15 is not connected to the interface 13, the ring 113 is blocked from falling out of the pressure vessel 15 by the outwardly angled at least one projection or leg 117 abutting against a portion of the neck wall 59a. Because the at least one projection or leg 117 is resilient, the at least one projection of leg 117, when being installed into position on the tube 187, may be squeezed inwardly and pushed past the flanges 205 and then released to angle outwardly away from the tube 187 again, so that when the pressure vessel 15 is not connected to the interface 13, the at least one projection or leg 117 is angled away from the tube 187 so that a portion of the at least one projection or leg 117 abuts against a portion of the neck wall 59a before the ring 113 may move in the axial direction off the tube 187.

When the flapper valve 211 is in an open position and fluid is flowing from upstream to downstream in the first passageway 45 of the pressure vessel 15, the fluid pushes against the flexible disk 209 causing it to flex in the downstream direction away from the neck wall 59a to open the first passageway 45 further to permit fluid to flow into the pressure vessel 15.

Preferably, the annular ridge or ramp 119 (see FIGS. 1 and 2) rimmed on a portion of the interior neck wall 59a (that is, the top wall 161 of the cover 159) of the pressure vessel 15 along the first passageway 45 of the pressure vessel 15 downstream of the disk 209 of the flapper valve 211 and surrounding the outer periphery 121 of the disk 209 of the flapper valve 211. The ridge or ramp 119 causes fluid back flowing in the first passageway 45 of the pressure vessel 15 from downstream of the ridge or ramp 119 to upstream of the ridge or ramp 119 to move over the ridge or ramp 119 and onto the side 122 of the disk 209 facing away from the inlet port 43 of the pressure vessel 15 to push the disk 209 into contact with the interior neck wall 59a of the pressure vessel 15 to close the first passage 45 of the pressure vessel 15 at the flapper valve 211 to reduce/prevent backflowing of fluid from the inlet port 43 of the pressure vessel 15.

Preferably, the flapper valve 211 also includes an o-ring 204 positioned in the groove 203 on the tube 187 upstream of the disk 209 of the flapper valve 211 for sealing between the disk 209 and the tube 187 when the disk 209 pushes against the o-ring 204 when the flapper valve 211 is in a closed position.

Figure 8:
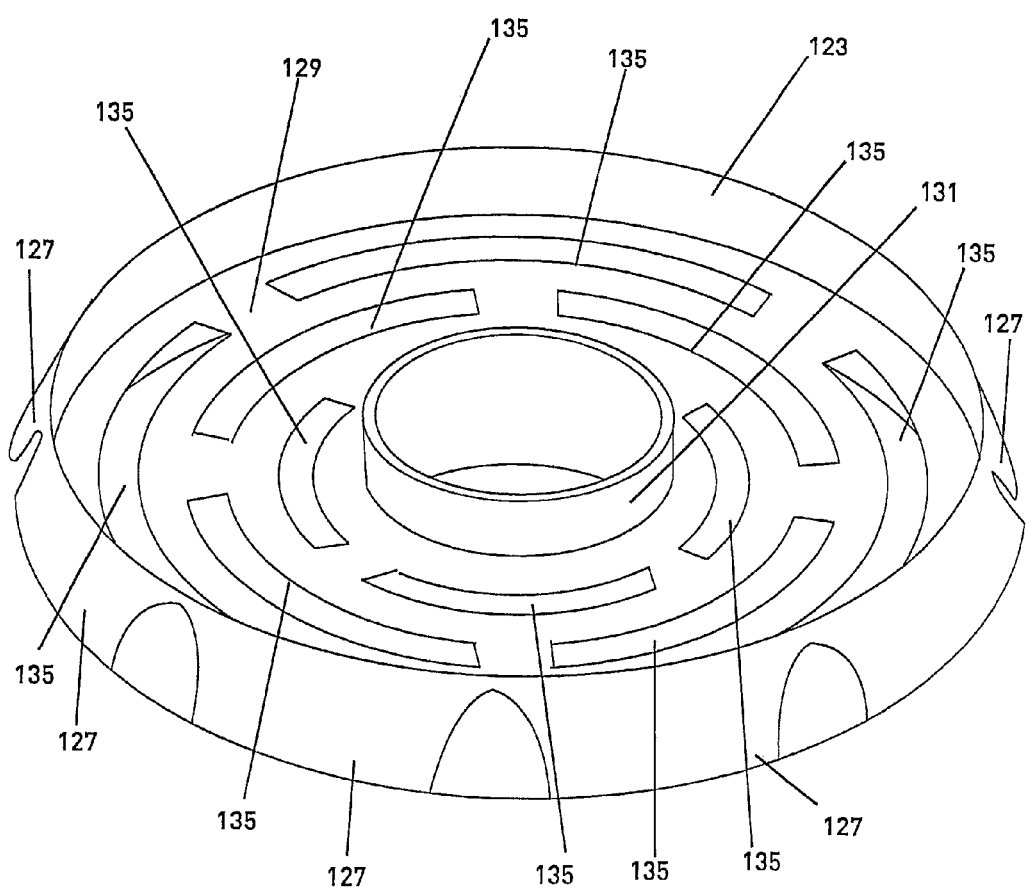
FIG. 8 is a view in perspective of a ring 123 for protecting the cartridge 16 against damage if the pressure vessel 15 containing the cartridge 16 is dropped.

Referring again to FIGS. 1 and 8, preferably a ring 123 is positioned adjacent to and between the cartridge 16 and the interior wall 125 of the main portion of pressure vessel 15. The ring 123 has outwardly extending resilient flanges 127 that engage the interior wall 125 of the pressure vessel 15 and act as shock absorbers to guard against damage to the cartridge 16 if the pressure vessel 15 is dropped. Preferably, the ring 123 is formed around and supported by a disk portion 129 that extends through the matrix 177 to a hollow cylindrical hub 131 that abuts against the interior wall 133 that defines the channel 179 extending through the center of the matrix 177. The hub 131 and the disk portion 129 act to hold the ring 123 in place around the cartridge 16. The disk portion 129 is provided with openings 135 to permit fluid flowing through the matrix 177 downstream of the disk portion 129 to move through the disk portion 129 into the matrix 177 upstream of the disk portion 129.

Referring to FIG. 1, preferably, a compressible column 213, such as one made of a polyfoam material and preferably one comprising a polyfoam sealed compressible core column, is mounted in the pressure vessel 15, preferably by bonding the end portion of the column 213 in a receptacle 215 of the end cap 181, and the column 213 extends from the receptacle 215 into the channel 179 such that there is still space for fluid to flow through the channel 179 between the matrix 177 and the compressible column 213. The compressible column 213 provides protection against damage to the pressure vessel 15 and/or the matrix 177 if the fluid to be filtered and/or conditioned and/or purified freezes while in the pressure vessel 15, by providing space for the fluid to expand into if the fluid (for example, water) is the type of fluid that expands during freezing. The compressible column 213 also provides protection for the pressure vessel 15 against possible millisecond and microsecond pressure spikes. Also, because the compressible polyfoam material of the column 213 has closed cells containing air, the operating weight of the pressure vessel 15 is lighter than the pressure vessel 15 not having a column 213 since part of the space inside the pressure vessel 15 is occupied by air (contained within the closed cells of the polyfoam material of the column 213) instead of the fluid being treated in the pressure vessel 15, and air weighs less than the fluid being treated, if the fluid being treated is water.

Referring again to FIGS. 1 to 4, the tube 187 also has a plurality of fins or flanges 214 (four such fins 214 being used in the embodiment shown in the drawings) formed on its interior surface portion in the first end portion 189 of the tube 187 that extend inwardly into the passageway 193 towards its central axis. Fluid may flow along the passageway 193 past the fins 214. Further, the tube 187 is provided with a plurality of cutouts 212 (four such cutouts 212 being used in the embodiment shown in the drawings) made thereon to permit fluid that has been filtered and/or conditioned and/or purified in the pressure vessel 15 to flow into the tube 187 from the channel 179 through the cutouts 212. If the column 213 ever breaks loose from the receptacle 215 and abuts against the first end portion 189 of the tube 187, the fins 214 block the column 213 from entering the tube 187, and the cutouts 212 permit fluid to continue to flow into the tube 187 even if the column 213 abuts against the first end portion 189 of the tube 187.

The tube 187 also is provided with a plurality of ribs 216 (eight such ribs 216 being used in the embodiment shown in the drawings) formed in its first end portion 189 on the exterior surface portion 195 adjacent to the flange portion 197 for engaging the matrix 177 along a portion of the channel 179 extending therethrough and for centering the tube 187 in the channel 179.

The cover 159 and the bowl 167 preferably are made from a polymeric material, and after the cartridge 16 is positioned on the cover 159 and the bowl 167, the cover 159 and the bowl 167 are joined together along their respective rims 165 and 173, preferably by spin welding, to fowl a sealed seam portion 217.

Figure 9:
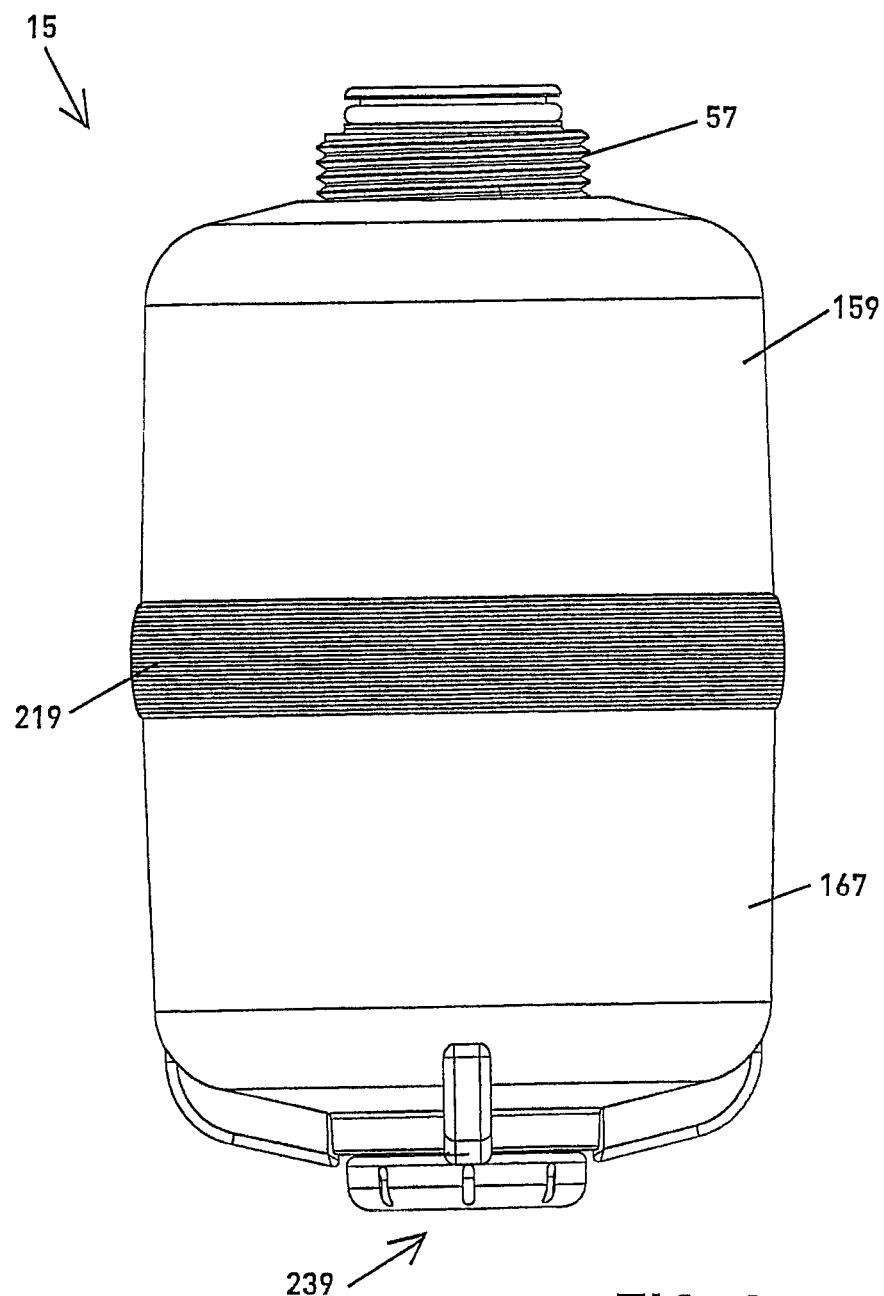
FIG. 9 is a view in front elevation of a pressure vessel 15 that is provided with a reinforcement member 219 secured around the sealed seam portion 217 of the pressure vessel 15.

Preferably, a reinforcement member 219 (FIG. 9) is secured around the pressure vessel 15, preferably around the side walls 163 and 171 of the pressure vessel 15 at and near the seam portion 217 of the pressure vessel 15 for reinforcing the pressure vessel 15, and preferably the seam portion 217 and the side walls 163 and 171 of the pressure vessel 15 at the seam portion 217. For example, the reinforcement member 219 may comprise fibers, such as carbon fibers or fiberglass or aramid fibers (e.g., Kevlar fibers) wrapped around the pressure vessel 15 and held together with epoxy or polyurethane or other binder. The reinforcement member 219 also may comprise reinforcing metal or other clamping device.

Figure 10:
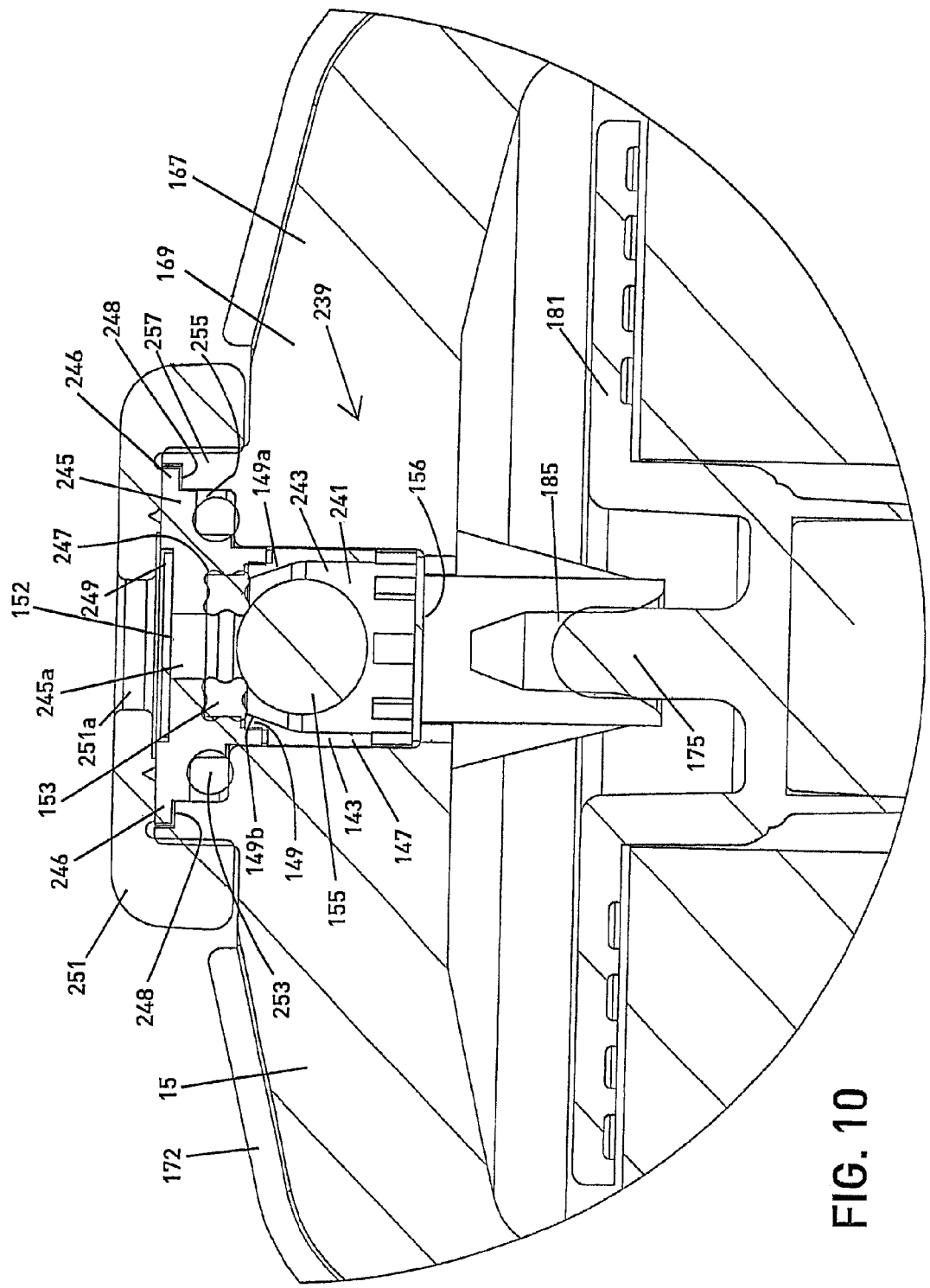
FIG. 10 is a partial view in cross-section showing an automatic venting device 239 formed in the bowl 167 of the pressure vessel 15, constructed in accordance with the invention.
Figure 11:
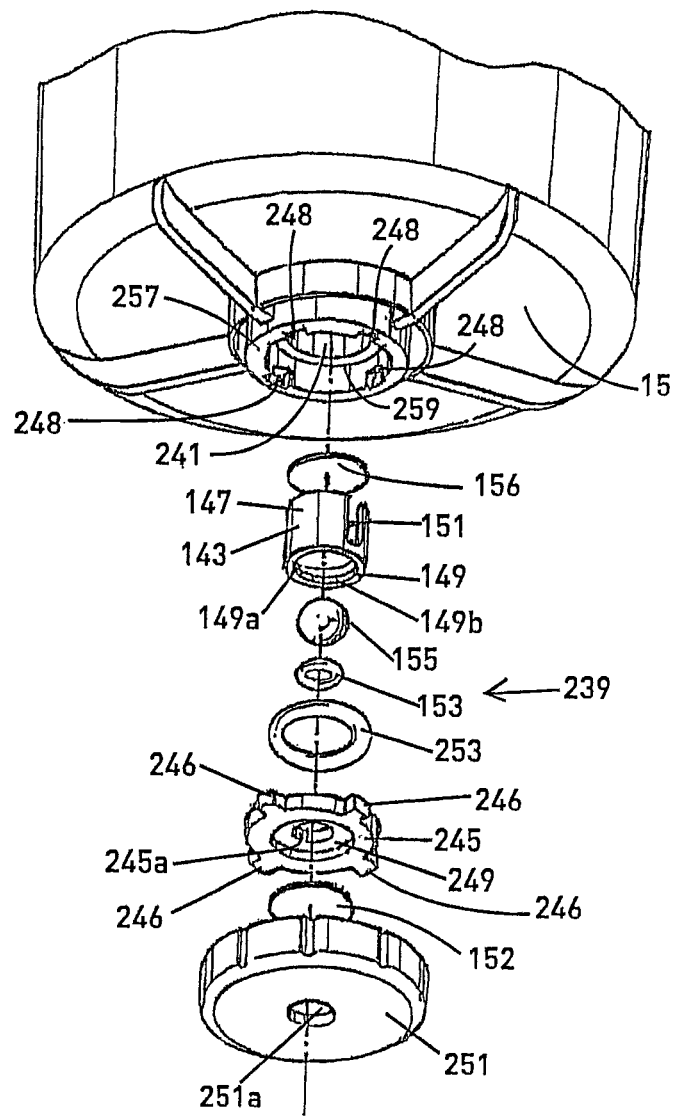
FIG. 11 is an exploded view of the automatic venting device 239 shown in FIG. 10.
Figure 20:
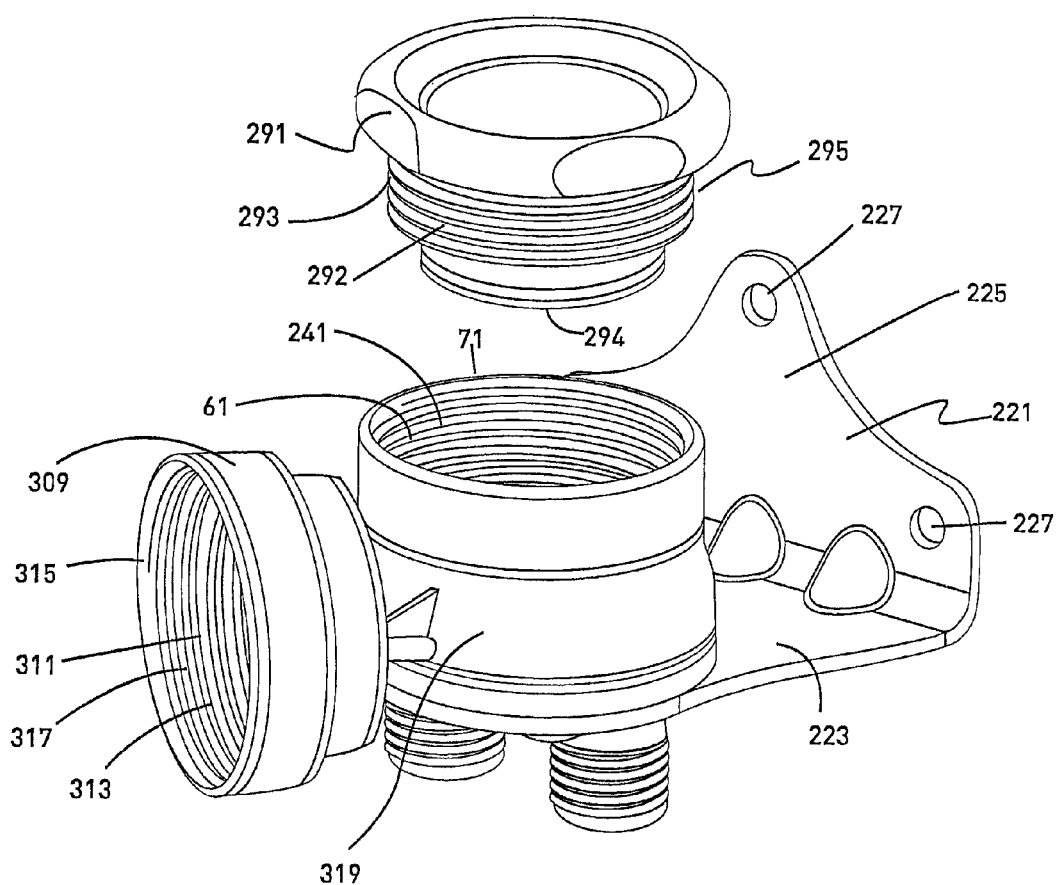
FIG. 20 is an exploded view showing the interface 13 with the mounting bracket 221 and the end cap holder 309 mounted thereon, and the end cap 291 exploded away from the recess 241 of the interface 13. In this figure, the end cap holder 309 is positioned on the interface 13 differently from where the end cap holder 309 is positioned on the interface 13 in FIGS. 12, 13, 15, and 16.
Figure 21:
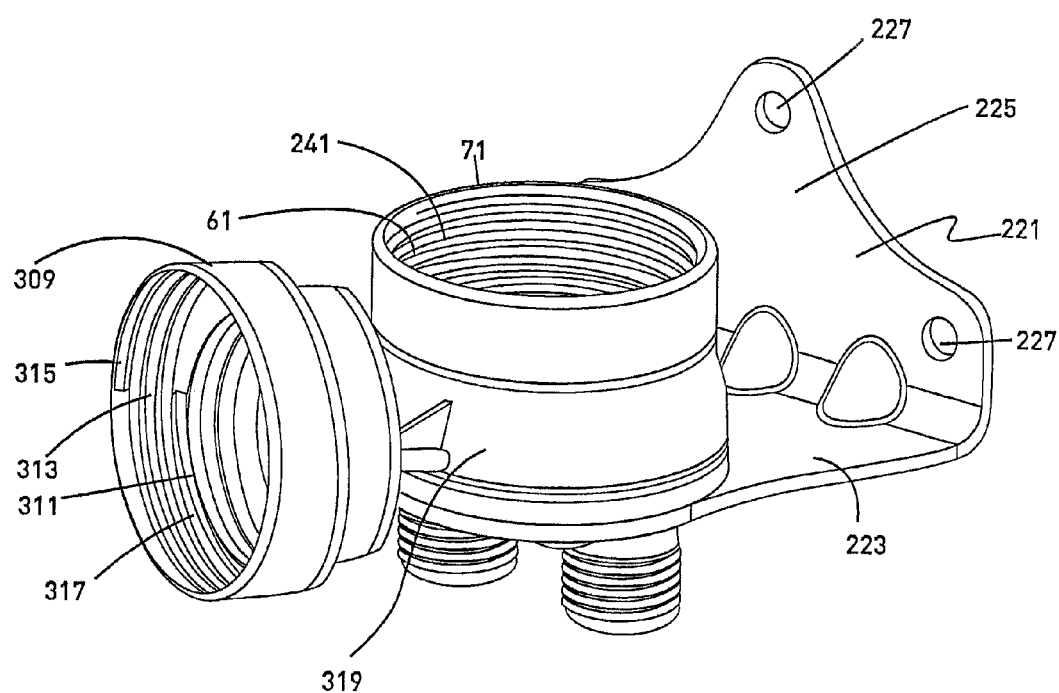
FIG. 21 is a view in perspective showing the interface 13, the mounting bracket 221, and the end cap holder 309 shown in FIG. 20.
Figure 22:
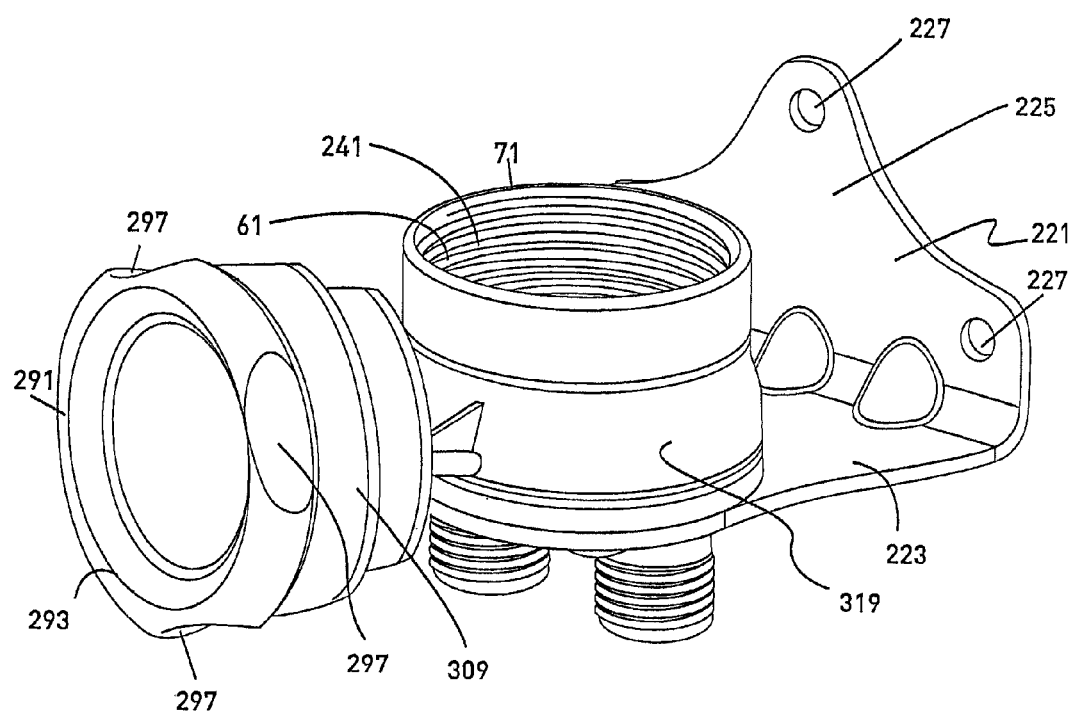
FIG. 22 is a view in perspective showing the interface 13, the mounting bracket 221, and the end cap holder 309 shown in FIG. 21, and the end cap 291 screwed into the recess 241 in the interface 13.

Referring to FIGS. 1, 10, and 11, when the pressure vessel 15 is positioned above the interface 13 as shown in FIG. 1, with the pressure vessel 15 oriented neck-side down when connected to the interface 13, preferably, the pressure vessel 15 is provided with an automatic venting device 239 for venting air and breaking any unwanted vacuum.

To form the automatic venting device 239 in the pressure vessel 15, a third passageway 241 is provided in the pressure vessel 15 that extends completely through the bottom wall 169 of its bowl 167, and the automatic venting device 239 is positioned in the passageway 241. The automatic venting device 239 includes a vent sleeve 143 positioned in a chamber 243 formed along the third passageway 241. The vent sleeve 143 of the automatic venting device 239 has a cylindrical wall 147 having an inwardly extending ledge 149 formed at the downstream end portion of the vent sleeve 143, and (as only illustrated in FIG. 11) optionally a plurality of cutouts 151 (two being used in the vent sleeve 143 illustrated in FIG. 11) formed in the wall 147 extending from the downstream end portion of the vent sleeve 143 toward the upstream end portion of the vent sleeve 143. The ledge 149 of the vent sleeve 143 has an upstream end portion 149a and a downstream end portion 149b, and each such end portion 149a and 149b preferably is chamfered. A seal member 153, such as an o-ring or x-ring or quad seal, is positioned immediately downstream of the downstream end portion 149b of the ledge 149 and is blocked by the downstream end portion 149b of the ledge 149 from falling upstream into the chamber 243. A vent seal 245 sits over and against the seal member 153, the vent seal 245 having a recess 247 that receives the downstream portion of the seal member 153 and a central opening 245a extending through the vent seal 245 through which air from the third passageway 241 vents. The vent seal 245 preferably is provided with tabs 246 which are received by recesses 248 formed in the annular ridge 257 formed in the bowl 167 of the pressure vessel 15. A ball 155 preferably having a density less than the density of the fluid (e.g., if water is the fluid, a preferred specific gravity for the ball 155 is about 0.97) is positioned in the vent sleeve 143 and permits venting of air and breaking of any unwanted vacuum until the fluid pushes the ball 155 into engagement with the seal member 153 creating a seal between the ball 155 and the seal member 153 and the seal member 153 and the vent seal 245, thereby closing the third passageway 241.

The diameter of the third passageway 241 at the chamber 243 and the diameters of the cylindrical vent sleeve 143 and the ball 155 of the automatic venting device 239 are greater than the diameter of the third passageway 241 upstream of the chamber 243.

A screen 156, positioned in the chamber 243 upstream of the vent sleeve 143 of the automatic venting device 239, and a screen 152, positioned in a recess 249 formed in the downstream side end portion of the vent seal 245 and held therein by a vent cap 251 positioned thereover, are provided to reject possible interfering debris or particulates.

An o-ring 253 sits around an annular ridge 255 formed in the downstream side of the vent seal 245 to seal between the vent seal 245 and the annular ridge 257 formed in the bowl 167 of the pressure vessel 15 that defines the outlet port 259 of the third passageway 241.

The vent cap 251, which has a central opening 251a extending therethrough which air from the third passageway 241 vents, is secured over the annular ridge 257 securing the screen 152 in the recess 249 of the vent seal 245, as well as securing the automatic venting device 239 in place in the third passageway 241.

When oriented as shown in FIG. 1, the invention facilitates providing fluid that has been filtered and/or conditioned and/or purified directly to a device in which the fluid is to be used, rather than providing the fluid to an intermediate location before it is subsequently transferred to the device in which the fluid is to be used. For example, if the fluid that is being filtered and/or conditioned and/or purified is water, rather than connecting the outlet port 53 of the interface 13 to a water receiving line that leads to a water faucet in the galley of an airplane, drawing water from the faucet into a container, and pouring the water from the container into an apparatus, such as a coffee maker, that uses the water, the outlet port 53 may be connected directly down onto the coffee maker. Accordingly, with this setup, there is less of a chance that the water, which has been filtered and/or conditioned and/or purified by moving through the matrix 177, becomes contaminated from coming into contact with contaminants like bacteria after leaving the outlet port 53.

Referring to FIGS. 1, 2, and 12 to 23, preferably, a mounting bracket 221 is provided for mounting the interface 13 in place where it is desired to be used. The mounting bracket 221 preferably has a plate 223 that connects to the interface 13, and a flange portion 225 extending at a right angle from the end portion of the plate 223 having holes 227 extending therethrough that receive screws, threaded bolts, or the like for mounting the bracket 221 to the place where it is desired to use the interface 13. In the embodiment of the invention shown in the drawings, the plate 223 has openings 228 through which threaded bolts 229 are inserted into threaded bores 231 in the interface 13 to secure the plate 223 to the interface 13.

Preferably, the inlet port 19 to the first passageway 17 of the interface 13 comprises a hollow cylinder-shaped inlet port member 233 that is removeably mounted on the interface 13 at the inlet end portion of the first passageway 17 of the interface 13, and the outlet port 53 of the second passageway 51 of the interface 13 comprises a hollow cylinder-shaped outlet port member 234 that is removably mounted on the interface 13 at the outlet end portion of the second passageway 51 of the interface 13. After the valve 21 is inserted into the portion of the first passageway 17 in the inlet port member 233, an o-ring 236 and the end portion 237 of the inlet port member 233 are inserted into the inlet end portion of the first passageway 17 just beyond the inlet port member 233 when the inlet port member 233 has been installed. Likewise, after the valve 95 is inserted into the portion of the second passageway 51 in the outlet port member 234, an o-ring 238 and the end portion 240 of the outlet port member 234 are inserted into the outlet end portion of the second passageway 51 just beyond the outlet port member 234 when the outlet port member 234 has been installed. Then, the inlet port member 233 and the outlet port member 234 are held in place on the interface 13 by positioning the plate 223 such that the inlet port member 233 extends through opening 247 in the plate 223 and the outlet port member 234 extends through opening 249 in the plate 223, and the plate 223 sandwiches an outwardly extending annular ledge 235 formed on the end portion 237 of the inlet port member 233 and an outwardly extending annular ledge 251 formed on the end portion 240 of the outlet port member 234 between the end portion 239 of interface 13 and the plate 223 of mounting bracket 221, the threaded bolts 229 extending through the plate 223 into the threaded bores 231 in the interface 13 holding the plate 223 in place on the interface 13.

The inlet port member 233 and the outlet port member 234 preferably are interchangeable with a variety of other port members, which may have, for instance, different lengths or connection means or internal bore sizes, to accommodate end user requirements.

Also, since the inlet port member 233 and the outlet port member 234 are removably mounted on the interface 13, they may be removed from the interface 13 by merely unscrewing the threaded bolts 229 from the interface 13 so that the plate 223 of the mounting bracket 221, the inlet port member 233, and the outlet port member 234 may be removed. The valve 21 and the valve 95 may be easily cleaned or repaired or replaced after they are slid from the passageways 17 and 51 of the interface 13 after the plate 223 and port members 233 and 234 have been removed off the interface 13. After cleaning or repairing the valves 21 and 95, they may be re-inserted into the respective port members 233 and 234 of the interface 13 and secured in place in the interface 13 by again removably mounting the port members 233 and 234 on the interface 13 using the plate 223 to secure the port members 233 and 234 in place. If it is desired to replace used valves 21 and 95 with new valves 21 and 95, new valves 21 and 95 are inserted into the respective port members 233 and 234 of the interface 13 rather than the cleaned or repaired valves 21 and 95.

In use, the pressure vessel 15 may be connected to the interface 13 by rotating the pressure vessel 15 into the interface 13 such that, in accordance with the invention, the neck 59 of the pressure vessel 15 is received in the recess 241 of the interface 13 and held therein by the engagement of the threads 57 being screwed into the threads 61 formed on the interface 13, with the end portion 191 of the tube 187 sealingly received in the inlet port 55 of the second passageway 51 of the interface 13 due to the o-rings 201 and 202 sealing between the wall of the inlet port 55 and the tube 187, and with a portion of the first end portion 73 of the neck 59 of the pressure vessel 15 pushing the pin 79 to cause the pin 79 to push the disk 33 of the first valve 21 off the valve seat 33 to open the first valve 21 to permit the flow of fluid through the first valve 21 and passageway 17, and with the end portion 112 of the inlet port 55 of the interface 13 pushing the ring 113 to cause the at least one projection or leg 117 to push the disk 209 out of contact with the neck wall 59a of the pressure vessel 15 to place and maintain the flapper valve 211 in the open position while the pressure vessel 15 is connected to the interface 13.

After flowing through the first passageway 17, the fluid exits the outlet port 41 of the first passageway 17 of the interface 13 and enters the first passageway 45 formed in the pressure vessel 15 though the inlet port 43, and then moves along the first passageway 45 to the outside of the matrix 177 and then through the matrix 177 to the channel 179 of the second passageway 47 formed in the pressure vessel 15. Next, the fluid flows from the channel 179 into and through the passageway 193 formed in the tube 187, and exits the pressure vessel 15 from the outlet port 49 formed at the end of the tube 187 and enters into the second passageway 51 formed in the interface 13 through the inlet port 55. Then, the fluid pushes the movable disk 33 of the second check valve 95 off the valve seat 31 of the second check valve 95 and moves it in a downstream direction away from the valve seat 31 of the second valve 95 to permit fluid to flow through the second valve 95 and through the second passageway 51 of the interface 13 to a fluid receiving line connected to the outlet port 53.

Unscrewing the pressure vessel 15 off the interface 13 discontinues flow of fluid through the first passageway 17 since the pin 79 is no longer being pushed by the pressure vessel 15 to lift the valve disk 33 of the valve 21 off the valve seat 31 of the valve 21 and the fluid flowing into the first passageway 17 pushes the valve disk 33 of the valve 21 back onto the valve seat 31 of the valve 21 to close valve 21.

Backflow of fluid from the second passageway 47 of the pressure vessel 13 is blocked by the check valve 95 since such backflow pushes the valve disk 33 of the valve 95 against the valve seat 31 of the valve 95 to close the valve 95.

Referring to FIGS. 12, 13, 15 to 20, 22, and 23, preferably, an end cap 291, preferably made of a polymer, is provided, to be secured onto the interface 13 when a pressure vessel 15 is not secured to the interface 13 to maintain a sanitary condition inside the interface 13 by blocking dirt, debris, or other contaminants from having easy access to the second end portion 71 of the interface 13, including the outlet port 41 from the first passageway 17 of the interface 13 and the inlet port 55 to the second passageway 51 of the interface 13. As shown in FIG. 18, preferably, the end cap 291 has a body 293 having a neck portion 295 for connecting the end cap 291 onto the interface 13 and having four indents 297 formed therein to facilitate gripping of the end cap 291 when rotating the end cap 291 into position on the interface 13 and when rotating end cap 291 off of the interface 13. Like the neck 59 of the pressure vessel 15, the neck portion 295 has threads 292 formed on the outer surface of the neck portion 295 that engage matching threads 61 formed on the interface 13 when the end cap 291 is screwed onto the interface 13 in place of a pressure vessel 15. The end cap 291 also includes a liner 294 (optionally made from or coated with an anti-microbial material) that is spin welded into place into a recess 295 formed in the body 293. An annular groove 305 is provided around the end cap 291, and an o-ring 307 sits in the annular groove 305 for sealing between the end cap 291 and the second end portion 239 of the interface 13 at the recess 241. A further application of the end cap 291, when screwed into the recess 241 to form a sealed connection therebetween, is to direct fluid that flows from the outlet port 41 of the first passageway 17 of the interface 13 into a portion 299 of the recess 241 between the outlet port 41 of the first passageway 17 of the interface 13 and the end cap 291 into the inlet port 55 of the second passageway 51 of the interface 13. If a canister (e.g., pressure vessels 15 containing filtration and/or conditioning and/or purification means such as a cartridge 16, loose media, or the like) becomes clogged during use of the apparatus 11 and there are no replacement canisters (e.g., pressure vessels 15 each containing filtration and/or conditioning and/or purification means such as a cartridge 16, loose media, or the like) available, the clogged canister may be removed from service (that is, removed from interface 13) and replaced with the end cap 291 so that fluid may flow through the fluid distribution system without being blocked at the interface 13 positioned along the fluid distribution system.

Preferably, an end cap holder 309 is provided for storing the end cap 291 when the end cap 291 is not in use. Preferably, the end cap holder 309 has a storage compartment 311 defined at least in part by a recess or tube-shaped portion 313 formed in the end cap holder 309 having an open end 315 in through which the end cap 291 may be inserted into the storage compartment 311. The tube-shaped portion 313 has an inside surface onto which is formed an internal threading 317 that matches and is connectably engageable with the threading 292 formed on the end cap 291 so that the end cap 291 may be secured in the storage compartment 311 of the end cap holder 309 when the end cap 291 is not in use by screwing the end cap 291 into the storage compartment 311. Preferably, the end cap holder 309 is provided with a snap ring 319 which may be extended around the interface 13 and closed to secure the end cap holder 309 to the interface 13. Accordingly, the end cap 291 may be stored when not in use in close proximity to the interface 13.

When it is desired to sanitize the fluid distribution system (e.g., an aircraft potable water distribution system) that the interface 13 is connected to, an end cap 291 may be screwed into the recess 241 of each interface 13 after the pressure vessel 15 has been removed from the interface 13. This permits sanitizing fluid used to sanitize the fluid distribution system to flow in the fluid distribution system along fluid transmission lines to each interface 13, through each interface 13, and then back to the fluid transmission lines of the fluid distribution system downstream from each interface 13.

In a preferred embodiment of the invention relating to providing filtered and/or conditioned and/or purified water, especially purified water, from a potable water distribution system of for example, an aircraft, interfaces 13 are installed locally at various cabin crew readily accessible service locations (service points) within galleys and lavatories of the aircraft, and the potable water distribution system is connected to each of the interfaces 13. Preferably, the interfaces 13 are positioned at or near where the water that is filtered and/or conditioned and/or purified in the pressure vessels 15 attached to the interfaces 13 is discharged from the potable water distribution system. With this arrangement, the interface 13 may be easily accessed to install filtration/purification canisters (e.g., pressure vessels 15 each containing filtration/conditioning/purification means such as a cartridge 16, loose media, or the like) onto the interfaces 13, and to remove filtration/purification canisters (e.g., pressure vessels 15 each containing filtration/conditioning/purification means such as a cartridge 16, loose media, or the like) that have been used and install fresh canisters (e.g., pressure vessels 15 each containing filtration/conditioning/purification means such as a cartridge 16, loose media, or the like) in their place. Also, in contrast to prior art aircraft potable water distribution systems where water is passed through a cluster of more remote or centralized filters/purifiers to remove chlorine, foul tastes, and odors, and then sent along branches or legs of the potable water distribution system to be discharged from the branches or legs for use, possibly becoming contaminated from bacteria growing in the branches or legs, under this preferred embodiment of our invention, the water is filtered and/or conditioned and/or purified at or very near the point where it is discharged from the interface 13 and actual used, thereby reducing the chances of contamination of the water after it has been filtered and/or conditioned and/or purified due to bacteria growing in the branches or legs or other possible contamination between the remote or centralized filters/purifiers and the point of discharge from the potable water distribution system. Further, when the interfaces 13 dispense water directly into an appliance, such as a coffee maker or hot water generating device for heating water for tea, access that contaminants have to the water after it has been filtered and/or conditioned and/or purified is even further limited.

Under the invention, water may be filtered and/or conditioned and/or purified at the point of use of the filtered and/or conditioned and/or purified water and at the time of use of the filtered and/or conditioned and/or purified water, significantly reducing chances of the filtered and/or conditioned and/or purified water becoming contaminated before it is used.

When it is desired to drain the fluid distribution lines of a fluid distribution system equipped with at least one apparatus 11 of the invention oriented with the pressure vessel 15 positioned above the interface 13 as shown in FIG. 1, the fluid in each pressure vessel 15 may be drained with the rest of the fluid in the fluid distribution system since fluid in each pressure vessel 15 may exit the pressure vessel 15 via not only the outlet port 49 of the pressure vessel 15 but also via the inlet port 43 of the pressure vessel 15 because the flapper valve 211 is in an open position when the pressure vessel 15 is connected to the interface 13. The fluid draining from the inlet port 43 of the pressure vessel 15 during the draining of the fluid distribution system may move past the first valve 21 (that is, back flow through the first valve 21) during draining of the fluid distribution system because the first valve 21 is held open by the actuating pin 79 since the pressure vessel 15 is positioned on the interface 13 during fluid draining of the fluid distribution system. Accordingly, when it is desired to drain the water distribution system in aircraft equipped with at least one apparatus 11 of the invention during periods of non-use (such as overnight) in cold climates, in accordance with the invention, the entire water distribution system including the pressure vessel(s) 15 may be drained without removing each pressure vessel 15 from each interface 13.

In addition to its applicability to aircraft potable water distribution systems, the invention may be applied in drinking water systems of recreational boats and yachts, commercial boats, recreational vehicles/caravans, residential homes, and water vending, cooling, warming and dispensing machines (such as those used in hospitals, schools, homes and factories). The invention also maybe applied to water systems in dental offices and laboratories.

The invention provides exceptional effectiveness (regarding water treatment results and cost effectiveness) and flexibility, and often weight reduction for aircraft and other uses with respect to providing filtered and/or conditioned and/or purified water. The apparatus 11 of the invention is easy to operate, requires little maintenance, and is dependable.

The apparatus 11 is very compact, light weight, long lasting, easily refurbished for extra-long service and embodies a slim-line design.

The filtration/purification canister (e.g., pressure vessel 15 containing filtration/conditioning/purification means such as a cartridge 16, loose media, or the like) may be provided with a light-weight composite construction. Due to its size/structure, the filtration/purification canister holds approximately 50% less unusable "transition water" (water retained in the canister necessary for the canister to function optimally) than prior art filters/purifiers, thereby making more of the water in the water distribution system available for use.

The invention provides point of use and time of use advantages. For instance, in an aircraft, the invention provides a potable water distribution system having interfaces 13 installed locally at various cabin crew readily accessible service locations or service points within galleys and lavatories of the aircraft, preferably at or near where water that is filtered and/or conditioned and/or purified is discharged from the potable water distribution system. Further, the invention provides for directly connecting the outlet port 53 of the interface 13 to an appliance such as a coffee maker used in the aircraft galley, which reduces possible exposure of the filtered and/or conditioned and/or purified water to contaminants that may be encountered if such water were to be indirectly brought from the outlet port 53 of the interface 13 to the appliance instead.

The invention provides for positioning the apparatus 11 of the invention in convenient, easily accessible locations. For instance, with respect to an aircraft water distribution system, in contrast to the prior art, the apparatuses 11 of the invention are provided at various cabin crew readily accessible service locations in the galleys and lavatories of the aircraft at or near where water that is to be filtered and/or conditioned and/or purified is to be discharged from the potable water distribution system.

The cartridge 16 may be obtained from General Ecology, Inc., of Exton, Pa., and may be configured to provide what the user desires for optimum service related to the application. For instance, the cartridge 16 may be configured to provide microbiological purification as independently certified to now current EPA Protocol for Microbiological Purifiers, or to provide scale control and taste and odor removal, or to provide taste and odor removal along with larger pathogen removal, etc.

In accordance with the invention, antimicrobial surfaces may be provided to various components of the apparatus 11, such as to the tube 187, to assist in preventing backwards directed growth of bacteria, mildew and fungus into the canister, especially during short tens periods of open non-use.

Backflow prevention provided in the interface 13 prevents spillage from the interface 13 when the canister is removed from the interface 13. Further, this backflow prevention prevents reverse water flow into the purified/filtered water side of the canister.

The valve 211, which preferably is made from a flexible elastomeric material, helps prevent backflow from the canister, thereby limiting spillage when the canister is removed from the interface 13.

Due to the construction of the interface 13, the interface 13 may be easily disassembled and inexpensively refurbished for exceptionally long life using readily available hand tools, if necessary, with common replacement components to replace items such as o-rings, check valves, etc. Accordingly, the interface 13 of the invention is long lasting.

In a preferred embodiment of the invention, the pressure vessel 15 may be provided with an automatically venting feature for venting air and breaking vacuum in the pressure vessel 15.

In addition to being capable of being mounted such that the canister is positioned on the interface 13 above the interface 13 (which facilitates direct feed of fluid from the apparatus 11 into appliances, such as coffee makers), the interface 13 may be mounted in an inverted position such that the outlet port 53 of the interface 13 points upwardly.

The apparatus 11 of the invention provides for exceptionally quick and easy one-handed canister changes by non-technical, untrained personnel.

Canisters (e.g., pressure vessels 15 each containing filtration/conditioning/purification means such as a cartridge 16, loose media, or the like) are disposable and can be completely incinerated. The pressure vessel 15 of the canister provides a barrier against contact with the internal, contaminated section of a used canister when it is being removed from the interface and discarded.

The apparatus 11 is provided with an automatic valving features, which discontinues flow from the outlet port 41 of the interface 13 when the canister is disconnected from the interface 13, and that activates flow of fluid (e.g., water) through the interface 13 into the canister when the canister is connected to the interface 13.

The canisters are protected from breaking if freezing occurs by the compressible column 213. Accordingly, draining of the canisters is not necessary if freezing temperatures exist. Further, the canisters function normally after thawing.

The canisters are heat resistant up to a survival temperature of 185° F. for two hours.

Canisters (e.g., pressure vessels 15 each containing filtration/conditioning/purification means such as a cartridge 16, loose media, or the like) of the invention are ready to use immediately after being installed with normally minimal purge of water to expel air and small amounts of residual manufacturing materials.

The end cap 291, an optional feature, is available to protect the water distribution system from contaminants and debris when a canister is not installed on an interface 13. The end cap 291, when screwed into recess 241, permits fluid to flow through the interface 13 that it is connected to, thereby allowing fluid to flow to the fluid distribution line of the fluid distribution system downstream of the interface 13.

The interface 13 may be installed with the interface 13 being positioned above or below the canister.

Because the invention provides for easy, quick, and cost effective replacement of the filtration/purification canisters (e.g., pressure vessels 15 each containing a cartridge 16) onto the interfaces 13, preferably, the filtration/purification canisters (e.g., pressure vessels 15 each containing a cartridge 16) may be removed from the interfaces 13 and replaced with new filtration/purification canisters (e.g., pressure vessels 15 each containing a cartridge 16) before each flight of the aircraft or before the first flight of the day for the aircraft, to avoid using a contaminated or spent filtration/purification canisters (e.g., pressure vessels 15 each containing a cartridge 16). In contrast, due to the cost and difficulty of changing filtration/purification canisters in prior art systems, changes of filtration/purification canisters in prior art systems are not typically done more often than every 90 days or so by a maintenance crew.

The invention claimed is:

1. A pressure vessel for filtering and/or conditioning and/or purifying a fluid, comprising
a housing,
means positioned in the pressure vessel for filtering and/or conditioning and/or purifying a fluid,
an inlet port for passage of fluid into the housing,
a first passageway extending from the inlet port to the means for filtering and/or conditioning and/or purifying a fluid,
an outlet port for passage of fluid from the housing,
a second passageway extending from the means for filtering and/or conditioning and/or purifying a fluid to the outlet port,
the second passageway including a tube through which a portion of the second passageway passes,
a flapper valve positioned inside the housing for reducing/preventing backflow of fluid from the inlet port of the pressure vessel when the flapper valve is in a closed position,
the flapper valve including a disk mounted on the tube in a first annular groove formed in an exterior surface portion of the tube, the disk having a central opening formed therein through which the tube extends, the disk being movable axially along the tube in the first annular groove formed on the tube between a closed position for the flapper valve, in which the disk closes the first passageway of the pressure vessel by extending across the first passageway of the pressure vessel and into contact against a portion of an interior wall of the pressure vessel along the first passageway of the pressure vessel and thereby reduce/prevent fluid from backflowing from the inlet port of the pressure vessel, and an open position for the flapper valve, in which the disk is positioned out of contact with the interior wall of the pressure vessel along the first passageway of the pressure vessel to open the first passageway of the pressure vessel to fluid flow through the first passageway of the pressure vessel, and
the flapper valve further including an actuating means for automatically opening the flapper valve when the pressure vessel is connected to an external interface,
the actuating means including a ring positioned around the exterior surface portion of the tube, the ring being movable axially along the tube, the ring having at least one projection extending from it towards the disk, the at least one projection moving towards and into contact with the disk when the ring is moved towards the disk to push the disk out of contact with the interior wall of the pressure vessel along the first passageway of the pressure vessel to open the first passageway of the pressure vessel.

2. The pressure vessel of claim 1,
the disk of the flapper valve having an outer periphery, a first side that faces towards the inlet port of the pressure vessel, and a second side that faces away from the inlet port of the pressure vessel, and further including
a ridge formed on a portion of the interior wall of the pressure vessel inside the housing along the first passageway of the pressure vessel downstream of the disk of the flapper valve,
the ridge surrounding the outer periphery of the disk of the flapper valve, the ridge causing fluid backflowing in the first passageway of the pressure vessel from downstream of the ridge to upstream of the ridge to move over the ridge and onto the second side of the disk of the flapper valve to push the disk into contact with the interior wall of the pressure vessel to close the first passage of the pressure vessel at the flapper valve to reduce/prevent backflowing of fluid from the inlet port of the pressure vessel.

3. The pressure vessel of claim 1, further including a ring positioned adjacent to and between the means for filtering and/or conditioning and/or purifying a fluid and the interior wall of the pressure vessel, the ring having outwardly extending resilient flanges that engage the interior wall of the pressure vessel and act as shock absorbers to guard against damage to the means for filtering and/or conditioning and/or purifying a fluid if the pressure vessel is dropped.

4. The pressure vessel of claim 1, the pressure vessel including a compressible member positioned within a bore located within and substantially surrounded by the means for filtering and/or conditioning and/or purifying a fluid for accommodating possible expansion of the fluid, the bore having a center axis, the compressible member protecting against damage to the pressure vessel and/or means for filtering and/or conditioning and/or purifying a fluid caused by freezing if the fluid freezes and expands in the pressure vessel by providing space for fluid to expand, the fluid expanding into and compressing the compressible member as the fluid freezes, the compressible member having an outer surface facing radially away from the center axis of the bore toward the means for filtering and/or conditioning and/or purifying a fluid surrounding said compressible member, and a majority of the outer surface of the compressible member being spaced out of contact with the means for filtering and/or conditioning and/or purifying a fluid.

5. The pressure vessel of claim 4, the compressible member including closed foam cells containing air.

6. The pressure vessel of claim 1, the actuating means further including an end portion of an interface that engages and pushes the ring towards the disk such that the at least one projection extending from the ring towards the disk moves into contact with the disk and raises the disk out of contact with the interior wall of the pressure vessel along the first passageway of the pressure vessel when the pressure vessel is connected to the interface to place and maintain the flapper valve in the open position while the pressure vessel is connected to the interface.

\* \* \* \* \*